(12) United States Patent
Lo et al.

(10) Patent No.: US 12,445,223 B2
(45) Date of Patent: Oct. 14, 2025

(54) SUPPORT OF POWER AMPLIFIER-AWARE MODULATION

(71) Applicant: Samsung Electronics Co., Ltd., Suwon-si (KR)

(72) Inventors: Caleb K. Lo, San Jose, CA (US); Joonyoung Cho, Portland, OR (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 18/589,238

(22) Filed: Feb. 27, 2024

(65) Prior Publication Data

US 2025/0007646 A1 Jan. 2, 2025

Related U.S. Application Data

(60) Provisional application No. 63/524,183, filed on Jun. 29, 2023.

(51) Int. Cl.
*H04L 1/00* (2006.01)
*H04L 27/26* (2006.01)

(52) U.S. Cl.
CPC .......... *H04L 1/0042* (2013.01); *H04L 1/0003* (2013.01); *H04L 27/2605* (2013.01)

(58) Field of Classification Search
CPC ... H04L 1/0003; H04L 1/0009; H04L 1/0025; H04L 1/0007; H04L 1/0026; H04L 1/0029; H04L 1/1671; H04L 27/2647; H04B 7/0626; H04B 17/345; H04B 7/10; H04B 10/58; H04B 7/0452; H04B 7/024; H04B 1/0475; H04B 10/505; H04B 10/25751; H04W 72/1268; H04W 72/20;
(Continued)

(56) References Cited

U.S. PATENT DOCUMENTS 6,252,912 B1 * 6/2001 Salinger ................ H04L 27/34
375/285
6,574,285 B2 6/2003 Galins
(Continued)

OTHER PUBLICATIONS

"5G; NR; Physical channels and modulation (3GPP TS 38.211 version 17.5.0 Release 17)", ETSI TS 138 211 V17.5.0, Jul. 2023, 141 pages.
(Continued)

*Primary Examiner* — Eva Y Puente

(57) ABSTRACT

Methods and devices for transmission symbol modulation that accounts for distortion introduced by a power amplifier (PA). A user equipment (UE) comprises a transceiver and a processor. The transceiver is configured to transmit, to a base station (BS), UE capability information that indicates support for adjusted symbol constellations, wherein the adjusted symbol constellations are adjusted to pre-compensate for distortion effects of a power amplifier (PA) in the transceiver, and receive, from the BS, a modulation and coding scheme (MCS) indication. The processor is configured to determine, based on the MCS indication, an adjusted symbol constellation, and generate modulation symbols from input bits according to the determined adjusted symbol constellation. The transceiver is further configured to transmit, to the BS, the modulation symbols.

20 Claims, 23 Drawing Sheets

(58) Field of Classification Search
CPC ............. H04W 52/52; H04W 72/0453; H04W 52/146; H04W 52/367; H04W 52/08; H04W 52/16
See application file for complete search history.

(56) References Cited

U.S. PATENT DOCUMENTS

| | | | |
|---|---|---|---|
| 7,039,126 | B2 | 5/2006 | Galins |
| 7,239,668 | B2 | 7/2007 | De Gaudenzi et al. |
| 7,336,716 | B2 | 2/2008 | Maltsev et al. |
| 10,567,210 | B2 | 2/2020 | Montorsi et al. |
| 2011/0063026 | A1 | 3/2011 | Jung et al. |
| 2014/0269861 | A1* | 9/2014 | Eliaz ............... H04B 1/0475 375/219 |
| 2019/0109753 | A1 | 4/2019 | Schneider et al. |
| 2024/0388315 | A1* | 11/2024 | Regev ............... H04L 27/01 |

OTHER PUBLICATIONS

"3rd Generation Partnership Project; Technical Specification Group Radio Access Network; NR; Radio Resource Control (RRC) protocol specification (Release 17)", 3GPP TS 38.331 V17.4.0, Mar. 2023, 1321 pages.

"3rd Generation Partnership Project; Technical Specification Group Radio Access Network; NR; Medium Access Control (MAC) protocol specification (Release 17)", 3GPP TS 38.321 V17.4.0, Mar. 2023, 252 pages.

"5G; NR; Physical layer procedures for data (3GPP TS 38.214 version 17.6.0 Release 17)", ETSI TS 138 214 V17.6.0, Jul. 2023, 236 pages.

International Search Report and Written Opinion issued Sep. 23, 2024 regarding International Application No. PCT/KR2024/008882, 7 pages.

Qi et al., "Analysis and Compensation of Power Amplifier Nonlinearity in MIMO Transmit Diversity Systems", IEEE Transactions on Vehicular Technology, vol. 59, No. 6, Jul. 2010, pp. 2921-2931.

Huawei et al., "Summary of discussion on LS on reduced 1024 QAM capability", 3GPP TSG-RAN WG1 Meeting #112, R1-2302149, Mar. 2023, 14 pages.

Pillai et al., "Implementation of Digital Pre-Distortion for Power Amplifier Linearisation in Software Defined Radio", 2017 Twenty-third National Conference on Communications (NCC), Mar. 2017, 6 pages.

* cited by examiner

| MCS | Base Point #1 | Base Point #2 | Base Point #3 | Base Point #4 |
|---|---|---|---|---|
| ... | ... | ... | ... | ... |
| Index 10 | (0.4, 0.4) | (1.4, 0.5) | (0.5, 1.4) | (1.6, 1.6) |
| ... | ... | ... | ... | ... |
| Index 13 | (0.25, 0.25) | (1.25, 0.4) | (0.4, 1.25) | (1.4, 1.4) |
| ... | ... | ... | ... | ... |
| Index 16 | (0.3, 0.3) | (0.9, 0.3) | (0.3, 0.9) | (0.9, 0.9) |
| ... | ... | ... | ... | ... |

SUPPORT OF POWER AMPLIFIER-AWARE MODULATION

CROSS-REFERENCE TO RELATED APPLICATION AND CLAIM OF PRIORITY

This application claims priority under 35 U.S.C. § 119(e) to U.S. Provisional Patent Application No. 63/524,183 filed on Jun. 29, 2023, which is hereby incorporated by reference in its entirety.

TECHNICAL FIELD

This disclosure relates generally to symbol generation in wireless communications systems. Embodiments of this disclosure relate to methods and apparatuses for determining a modulation scheme with an adjusted symbol constellation to pre-compensate for distortion effects of a power amplifier.

BACKGROUND

In wireless communication systems, data bits to be transmitted are encoded, and the encoded bits are modulated according to a modulation method such as quadrature amplitude modulation (QAM). This modulation method yields symbols that are subject to additional transmit-side processing. These processed symbols are eventually amplified by a power amplifier (PA) before over-the-air (OTA) transmission. PA amplification combats signal impairments such as path loss and receive-side additive noise.

PA amplification introduces additional signal impairments, however. For example, the input-output PA characteristic has both a linear region (where output power scales linearly with input power) and a nonlinear region (where output power saturates with input power). Thus, modulation symbols that differ in amplitude may not be uniformly scaled by a PA. Additionally, the input-output PA characteristic exhibits memory effects, where the output at a given time instant is a function of modulation symbols input at previous time instants. Thus, the PA output may be "smeared" around a given modulation symbol, where the amount of "smearing" depends on the memory effects.

SUMMARY

Embodiments of the present disclosure provide methods and apparatuses facilitating symbol modulation that accounts for distortion introduced by a PA in a wireless transmission device.

In one embodiment, a user equipment (UE) comprises a transceiver and a processor operably coupled to the transceiver. The transceiver is configured to transmit, to a BS, UE capability information that indicates support for adjusted symbol constellations, wherein the adjusted symbol constellations are adjusted to pre-compensate for distortion effects of a PA in the transceiver, and receive, from the BS, an MCS indication. The processor is configured to determine, based on the MCS indication, an adjusted symbol constellation, and generate modulation symbols from input bits according to the determined adjusted symbol constellation. The transceiver is further configured to transmit, to the BS, the modulation symbols.

In another embodiment, a BS comprises a transceiver and a processor operably coupled to the transceiver. The transceiver is configured to receive, from a UE, UE capability information that indicates adjusted symbol constellations supported by the UE, wherein the adjusted symbol constellations are adjusted to pre-compensate for distortion effects of a PA in a transceiver of the UE. The processor is configured to generate, based on the UE capability information, an MCS indication. The transceiver is further configured to transmit, to the UE, the MCS indication and receive, from the UE, modulation symbols corresponding to an adjusted symbol constellation that corresponds to the MCS indication.

In another embodiment, a method of operation of a UE comprises the steps of transmitting, to a BS, UE capability information that indicates adjusted symbol constellations supported by the UE, wherein the adjusted symbol constellations are adjusted to pre-compensate for distortion effects of a PA in the transceiver, receiving, from the BS, an MCS indication, determining, based on the MCS indication, an adjusted symbol constellation, generating modulation symbols from input bits according to the determined adjusted symbol constellation, and transmitting, to the BS, the modulation symbols.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following abbreviations may be referred to herein:
AI (Artificial Intelligence)
AM (Amplitude Modulation)
BS (Base Station)
CE (Control Element)
dBm (decibels per milliwatt)
DCI (Downlink Control Information)
IE (Information Element)
MCS (Modulation and Coding Scheme)
OTA (Over-the-Air)
PA (Power Amplifier)
PDCCH (Physical Downlink Control Channel)
PUSCH (Physical Uplink Shared Channel)
PUCCH (Physical Uplink Control Channel)
QAM (Quadrature Amplitude Modulation)
RRC (Radio Resource Control)
SER (Symbol Error Rate)
UCI (Uplink Control Information)
UE (User Equipment)

Definitions for other certain words and phrases are provided throughout this patent document. Those of ordinary skill in the art should understand that in many if not most instances, such definitions apply to prior as well as future uses of such defined words and phrases.

The following documents are incorporated by reference herein in their entirety:
[1] 3GPP, TS 38.211, 5G; NR; Physical channels and modulation.
[2] 3GPP, TS 38.331, 5G; NR; Radio Resource Control (RRC); Protocol specification.
[3] 3GPP, TS 38.321, 5G; NR; Medium Access Control (MAC); Protocol specification.
[4] 3GPP, TS 38.214, 5G; NR; Physical layer procedures for data.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that the performance of conventional modulation methods is impaired by distortion effects caused by PA amplification due to the input-output PA characteristic.

Accordingly, embodiments of the present disclosure provide a framework supporting modulation methods that account for the input-output PA characteristic. For example, considering the standard 16-QAM constellation, if the four outermost modulation symbols (i.e., the corner symbols) lie in the nonlinear region of the PA characteristic, while the other twelve modulation symbols lie in the linear region of the PA characteristic, then the constellation can be modified by applying a pre-scaling factor to only the four outermost modulation symbols. This pre-scaling factor can be chosen such that at the PA output, all sixteen modulation symbols have been uniformly scaled.

Embodiments of the present disclosure provide methods and apparatuses that can be used by a network to configure additional modulation methods that account for the input-output PA characteristic. Some corresponding signaling details of these methods, including information elements to be exchanged between a transmitter and a receiver, are also discussed in this disclosure.

Figure 1:
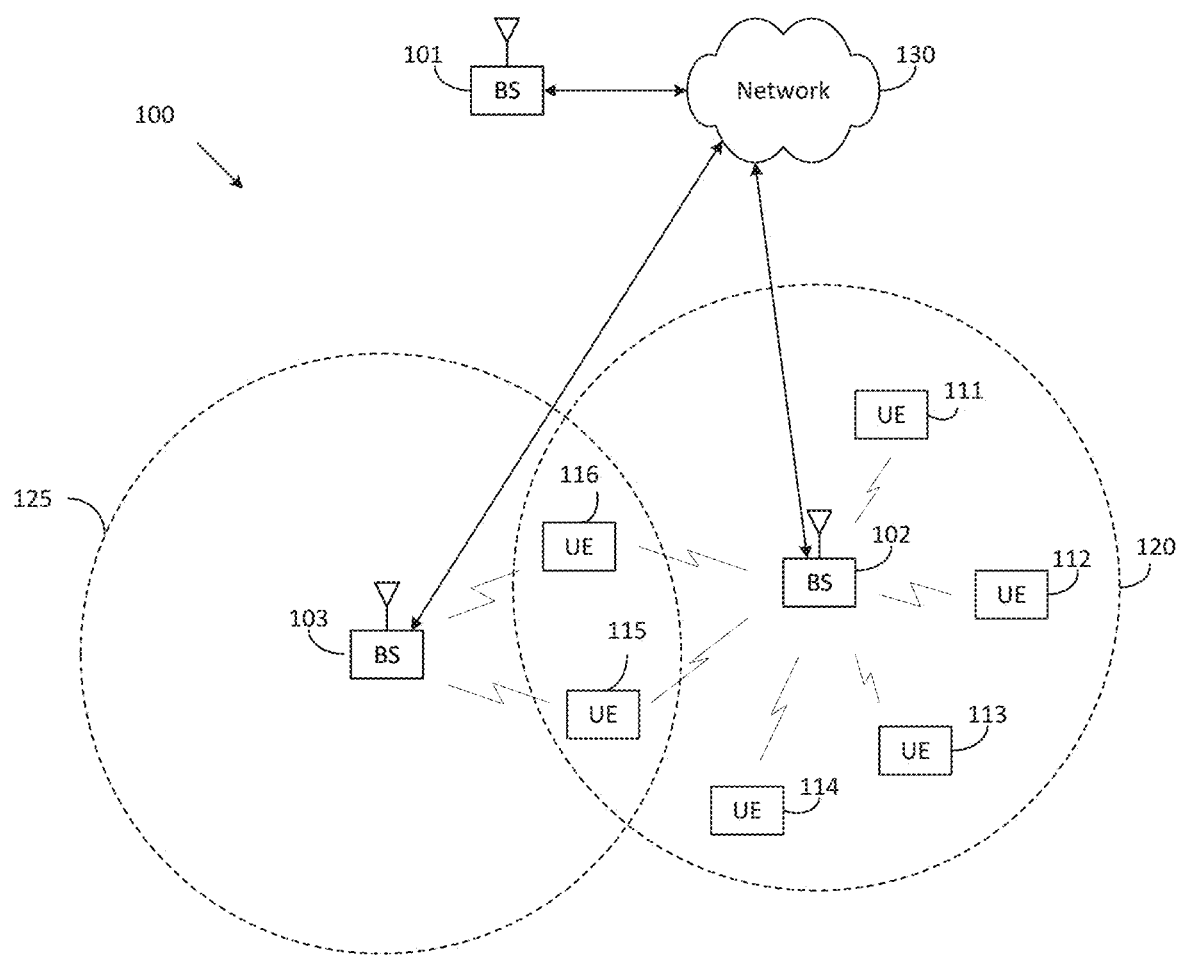
FIG. 1 illustrates an example wireless network according to various embodiments of the present disclosure.
Figure 2:
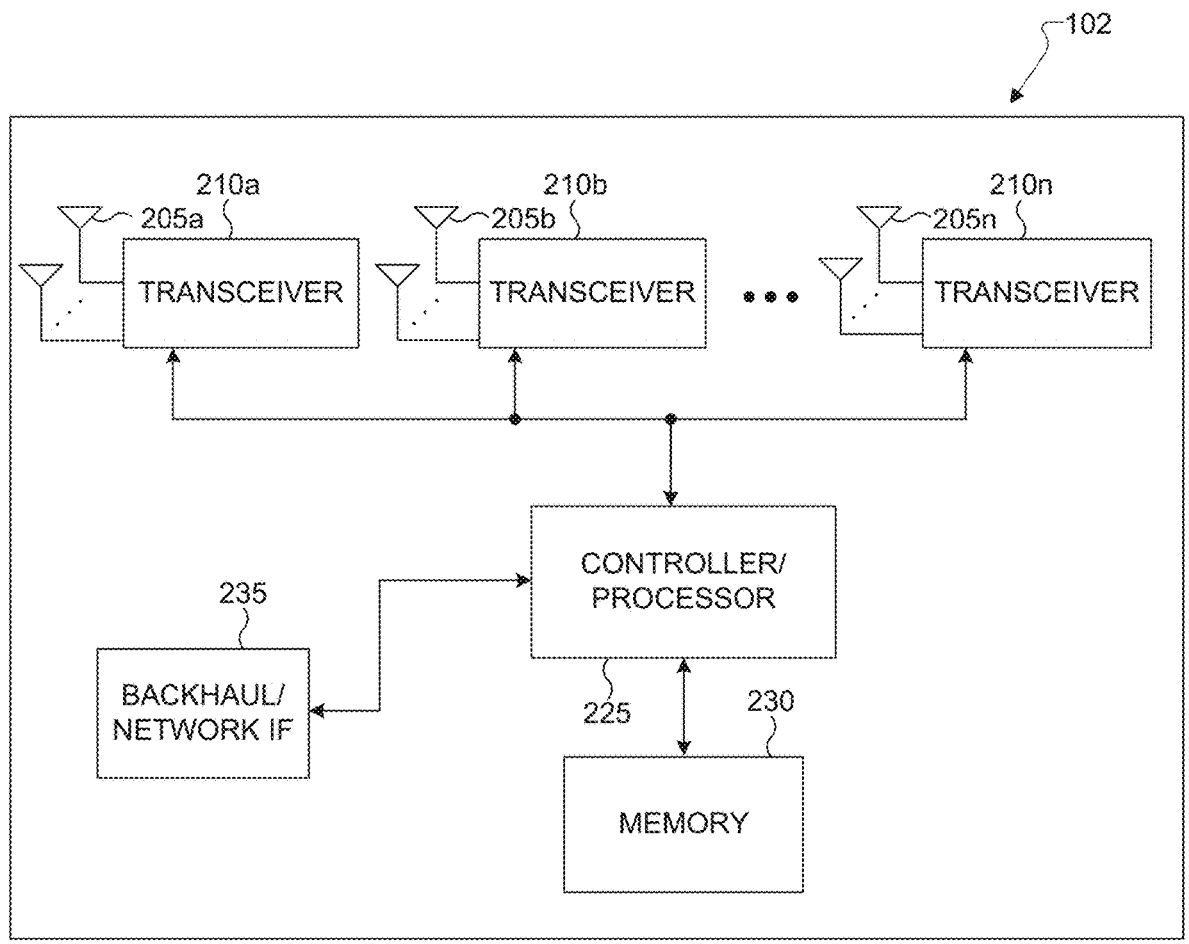
FIG. 2 illustrates an example gNB according to embodiments of the present disclosure.
Figure 3:
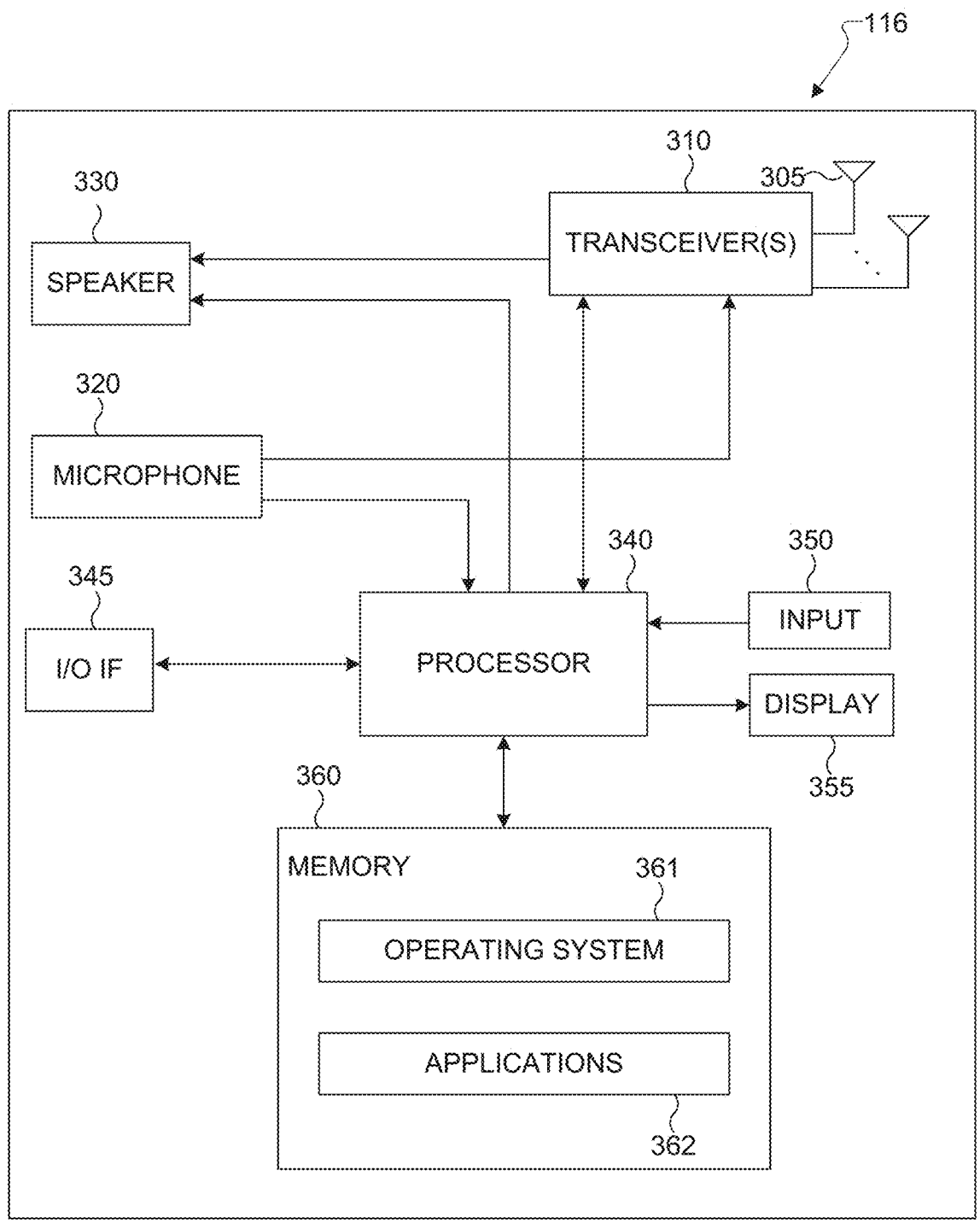
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for determining a modulation scheme with an adjusted symbol constellation to pre-compensate for distortion effects of a power amplifier. In certain embodiments, and one or more of the gNBs 101-103 includes circuitry, programing, or a combination thereof, to support determining a modulation scheme with an adjusted symbol constellation to pre-compensate for distortion effects of a power amplifier.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130 Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205-205n. In some embodiments, the transceivers 210a-210n each include an adjusted modulator and PA that facilitate symbol modulation that accounts for distortion introduced by the PA, as discussed further below. In some embodiments, the transceivers 210a-210n further include a digital pre-distorter (DPD) that further facilitates symbol modulation that accounts for distortion introduced by the PA, as discussed further below. In other embodiments, the controller/processor 225 can include the functionality of the DPD.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for determining a modulation scheme with an adjusted symbol constellation to pre-compensate for distortion effects of a power amplifier. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305. In some embodiments, the TX processing circuitry in the transceivers(s) 310 include an adjusted modulator and PA that facilitate symbol modulation that accounts for distortion introduced by the PA, as discussed further below. In some embodiments, the transceivers 310 further include a DPD that further facilitates symbol modulation that accounts for distortion introduced by the PA, as discussed further below. In other embodiments, the processor 340 can include the functionality of the DPD.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for determining a modulation scheme with an adjusted symbol constellation to pre-compensate for distortion effects of a power amplifier. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

As discussed herein above, when digital information bits are prepared for transmission in a wireless system (e.g., a gNB 102 or UE 116) they are encoded, the encoded bits are modulated to generate symbols, and the symbols are further processed before being amplified by a PA for transmission. PA amplification pre-compensates for path loss and additive noise at the receiver to ensure that the message can be received. This comes at the cost of introducing distortion effects that are inherent to the PA, however. A PA may introduce both nonlinear effects and memory effects that impact the modulation symbols input to the PA, resulting in distorted transmission symbols that may be erroneously demodulated at the receiver.

Figure 4:
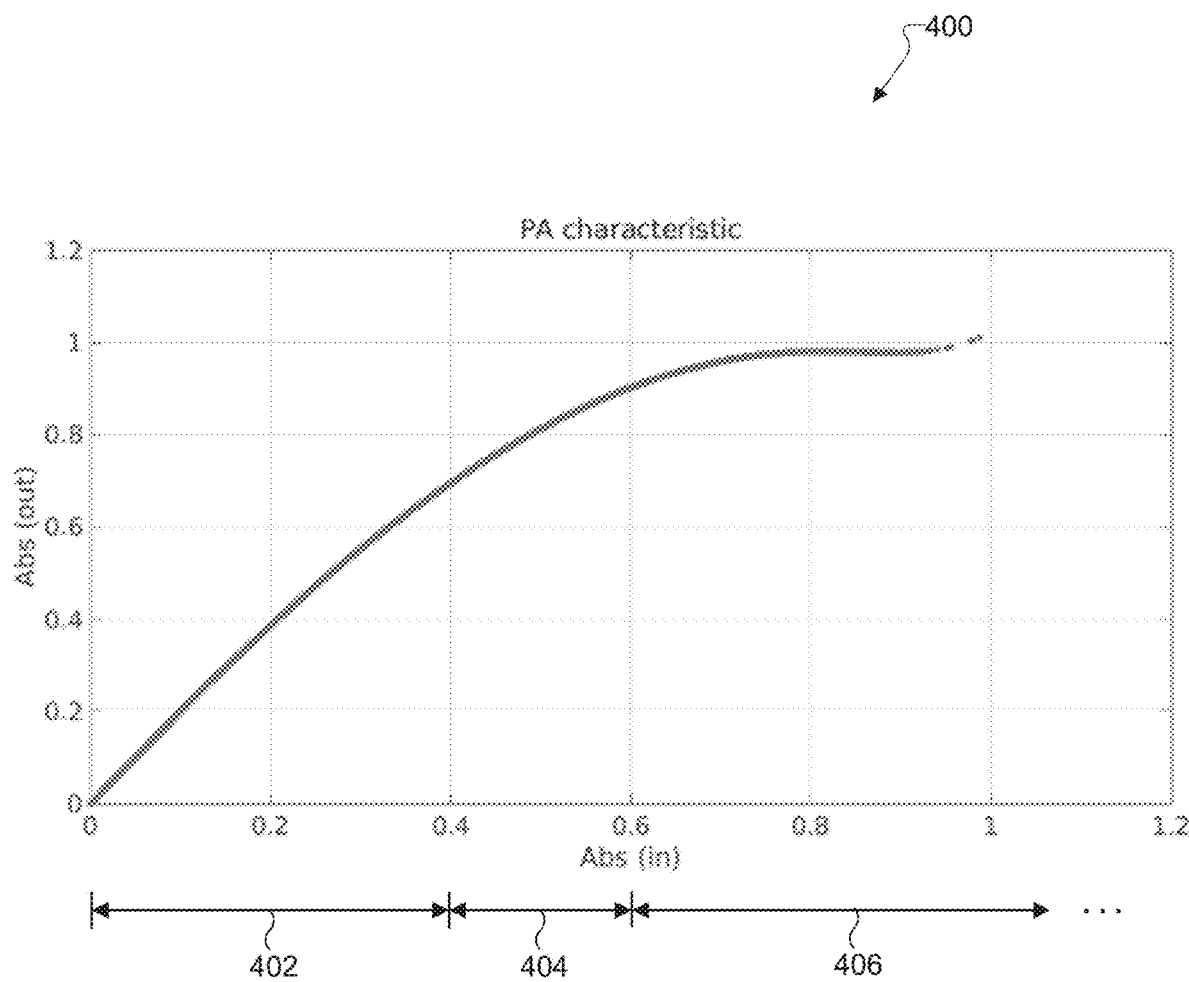
FIG. 4 illustrates an example input-output PA characteristic according to embodiments of the present disclosure.

FIG. 4 illustrates an example input-output PA characteristic 400 according to embodiments of the present disclosure. The example PA characteristic 400 can be divided into roughly three regions: Region 1 (402) with input amplitudes between 0 and 0.4, where the PA output scales almost linearly with the input, Region 2 (404) with input amplitudes between 0.4 and 0.6, where the PA output scales almost linearly with the input, though the slope has decreased from that of Region 1, and Region 3 (406) with input amplitudes above 0.6, where the PA output scales nonlinearly with the input—in fact, for input amplitudes above 0.8, the PA output has effectively saturated. The nonlinear distortion in the example PA characteristic 400 motivates the application of modulation methods that account for it.

Figure 5:
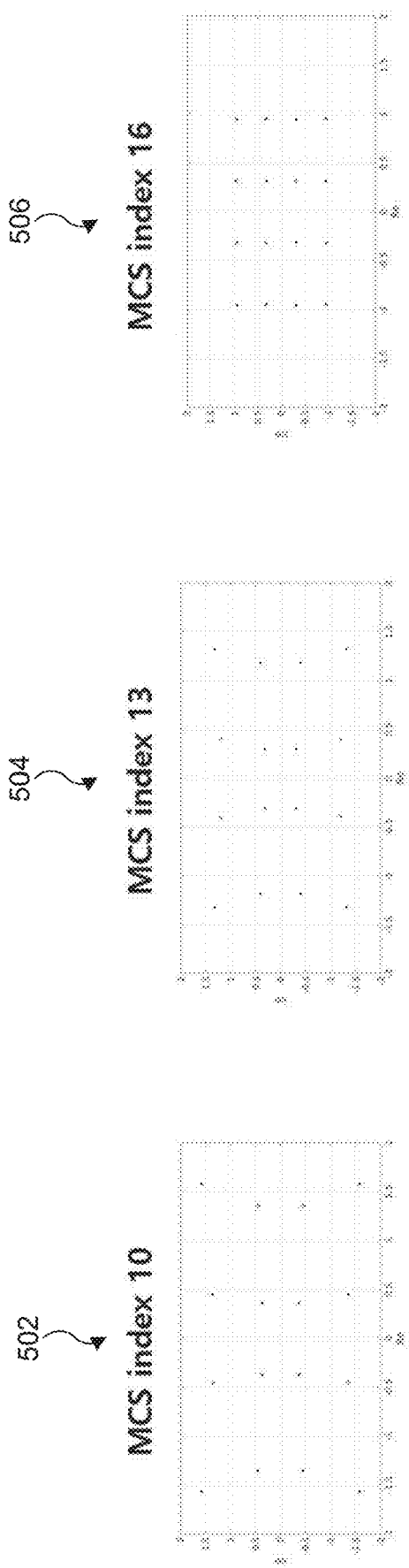
FIG. 5 illustrates an example of modulation symbol constellations according to embodiments of the present disclosure.

FIG. 5 illustrates an example of modulation symbol constellations according to embodiments of the present disclosure. The three constellations in FIG. 5 are considered for use with a PA having the PA characteristic 400 of FIG. 4. Additionally, the constellations in FIG. 5 are mapped to different MCS indices. Assuming that all sixteen modulation symbols in the rightmost constellation 506 lie in Region 1 (402) of the PA characteristic 400, this PA will apply a uniform scaling to this constellation. If the four outermost symbols in the rightmost constellation 506 lie in Region 3 (406) of the PA characteristic 400, though, then this PA will not apply a uniform scaling to this constellation. By contrast, the non-uniform spacing that can be observed in the middle constellation 504 and the leftmost constellation 502 can be viewed as pre-scaling of the outermost (and, in this case, the middle) modulation symbols before PA amplification. When modulation symbols from these constellations are applied at the corresponding target PA operating points, the constellations of the transmission symbols at the PA output are almost square (e.g., the constellation 1250 on the right of FIG. 12, discussed below).

FIG. 5 also highlights a PA-aware modification of the conventional approach for determining a modulation method. For example, Table 5.1.3.1-1 in [4] shows that modulation and coding scheme (MCS) indices 10-16 all map to one modulation method, i.e., 16-QAM. FIG. 5 illustrates that this approach can be modified to support different constellations depending on MCS index for a given modulation order, which can compensate for nonlinear distortion Amplifying each of the constellations in FIG. 5 using a given PA could yield a different output constellation—and a different spectral efficiency—even if one code rate is used for MCS indices 10-16.

Figure 6:
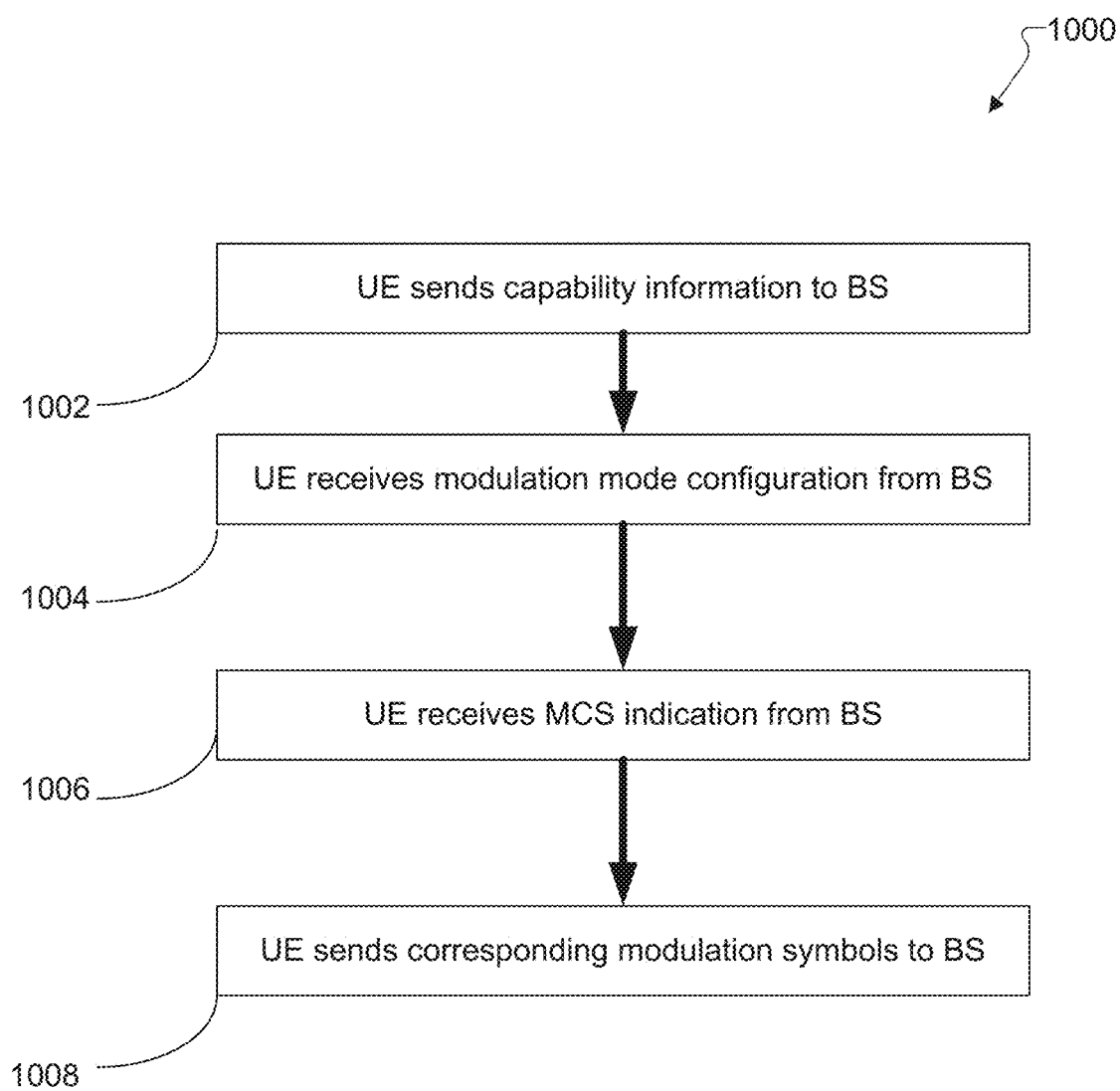
FIG. 6 illustrates an example method for operations of a UE to support different constellations depending on MCS index for a given modulation order according to embodiments of the present disclosure.

FIG. 6 illustrates an example method 1000 for operations of a UE to support different constellations depending on MCS index for a given modulation order according to embodiments of the present disclosure. At operation 1002, the UE sends its capability information to a BS, including its capability to support additional modulation methods besides the conventional modulation methods (e.g., its capability to support modulation methods using adjusted symbol constellations, which may be adjusted from conventional symbol constellations such as that for 16-QAM). At operation 1004, the UE receives modulation mode configuration information from the BS, which can include information such as enabling/disabling of the mapping between an MCS index and a modulation method. At operation 1006, the UE receives an MCS indication message from the BS. The BS can use an existing DCI format for this MCS indication message. The BS can also define a new DCI format for this MCS indication message. In one example, the UE uses this MCS indication message to determine an MCS index. In another example, the UE may autonomously determine an MCS index. At operation 1008, the UE sends modulation symbols to the BS, which may have been selected from the constellation corresponding to the MCS index (which may be, e.g., an adjusted symbol constellation).

Figure 7:
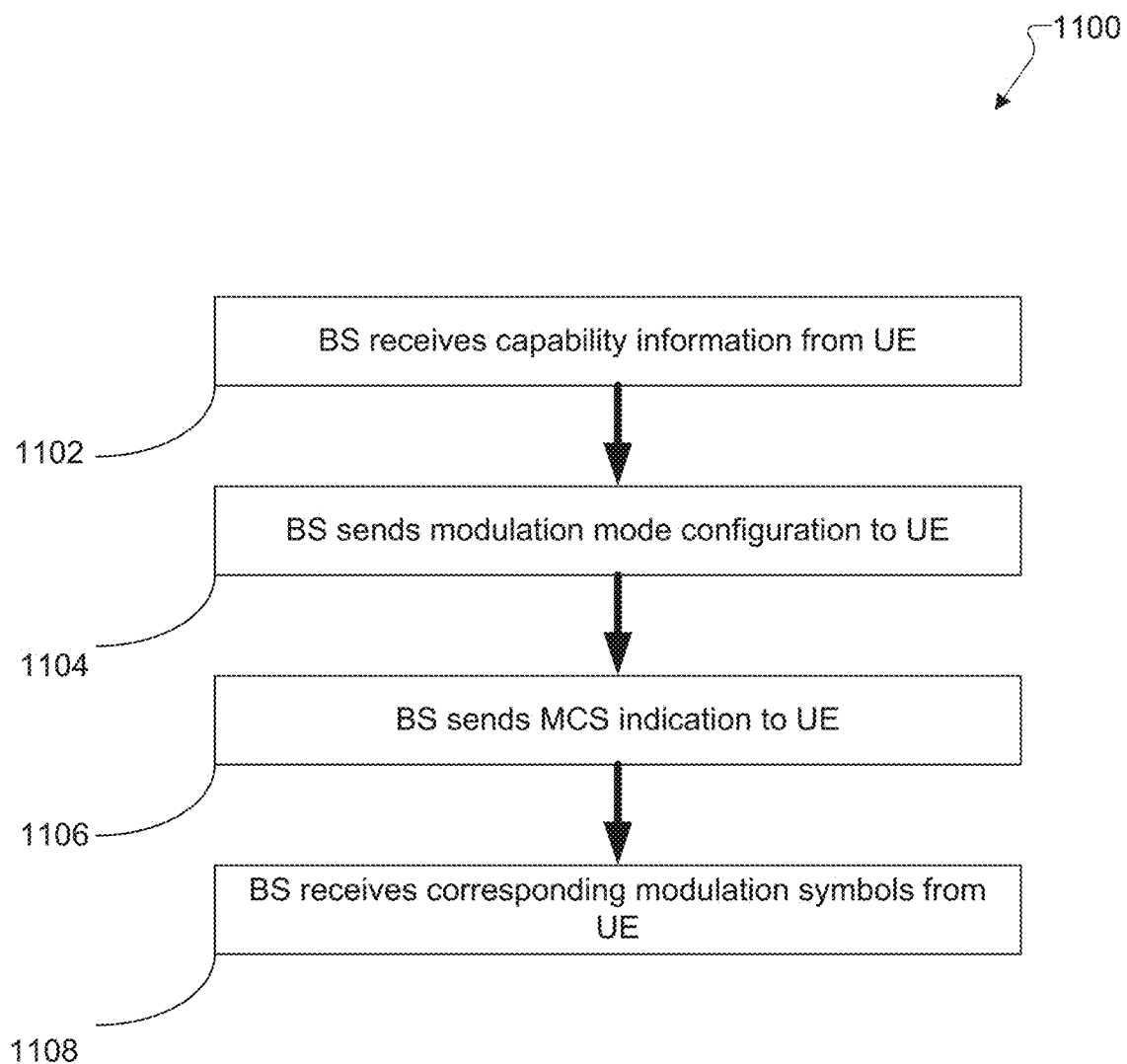
FIG. 7 illustrates an example method for operations of a BS to support different constellations depending on MCS index for a given modulation order according to embodiments of the present disclosure.

FIG. 7 illustrates an example method 1100 for operations of a BS to support different constellations depending on MCS index for a given modulation order according to embodiments of the present disclosure. At operation 1102, the BS receives capability information from a UE, including its capability to support additional modulation methods besides the conventional modulation methods (e.g., its capability to support modulation methods using adjusted symbol constellations, which may be adjusted from conventional symbol constellations such as that for 16-QAM). At operation 1104, the BS sends modulation mode configuration information to the UE, which can include information such as enabling/disabling of the mapping between an MCS index and a modulation method. At operation 1106, the BS sends an MCS indication message to the UE. The BS can use an existing DCI format for this MCS indication message. The BS can also define a new DCI format for this MCS indication message. In one example, the UE uses this MCS indication message to determine an MCS index. In another example, the UE autonomously determines an MCS index. At operation 1108, the BS receives modulation symbols from the UE, which may have been selected from the constellation corresponding to the MCS index (which may be, e.g., an adjusted symbol constellation).

In various embodiments of the present disclosure, a UE can indicate its capability to support additional modulation methods besides the conventional modulation methods (e.g., modulation methods using adjusted symbol constellations, which may be adjusted from conventional symbol constellations such as that for 16-QAM). To signal its capabilities, the UE may use a modified ModulationOrder IE to indicate all of the modulation methods that the UE can support. One example of a modified ModulationOrder IE used as a UE capability information message is provided below:

ModulationOrder::=BIT STRING{SIZE(NumMod-Methods)}

In this example, "NumModMethods" corresponds to the total number of modulation methods, each value in the bit string corresponds to a modulation method, and values set to "1" in the bit string correspond to the modulation methods that this UE can support. In some embodiments, the modified ModulationOrder IE can indicate support for MCS index-dependent adjusted constellations for a given modulation order. In some embodiments, a BS can configure a UE to send an indication of its supported modulation methods via a MAC CE activation command. In some embodiments, a BS can configure a UE to send an indication of its supported modulation methods via DCI.

Figure 8:
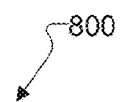
FIG. 8 illustrates an example lookup table for facilitating determination of a modulation method based on an MCS index according to embodiments of the present disclosure.

FIG. 8 illustrates an example lookup table 800 for facilitating determination of a modulation method based on an MCS index according to embodiments of the present disclosure. The example lookup table (or LUT) 800 may be used to support selection by a UE of different constellations depending on a determined MCS index for a given modulation order. In this example, each MCS index maps to a set of 4 "base points". Each of these base points lies in the first quadrant of the complex plane. These "base points" can be reflected about the real and imaginary axes of the complex plane to obtain all of the points for a given constellation of size 16. A device can then use this set of 16 points to modulate encoded bits.

Figure 9:
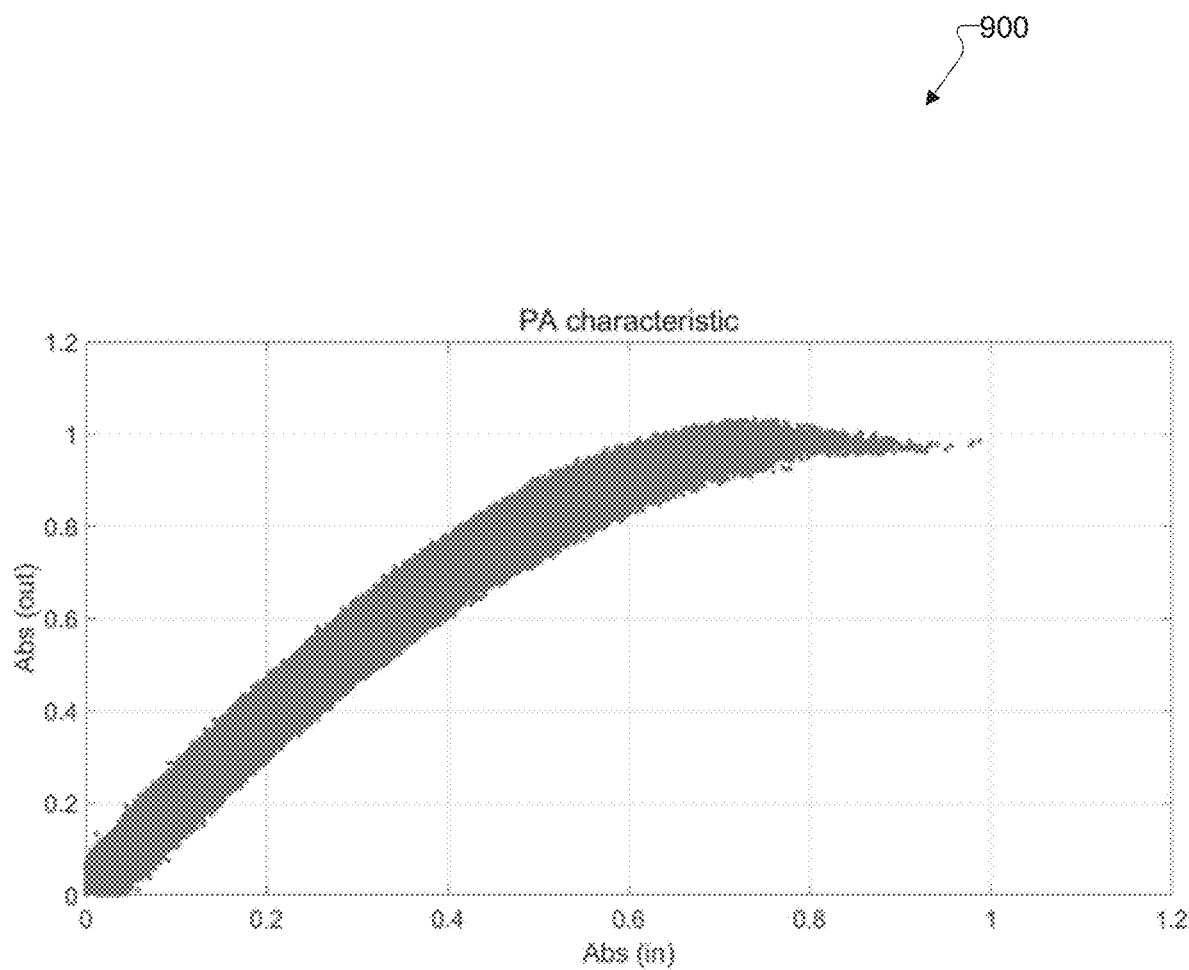
FIG. 9 illustrates an example input-output PA characteristic used for performance evaluations according to embodiments of the present disclosure.

FIG. 9 illustrates an example input-output PA characteristic 900 used for performance evaluations according to embodiments of the present disclosure. The input-output PA characteristic 900 exhibits the saturation in the nonlinear region that can be observed in FIG. 4. The input-output characteristic 900 also exhibits memory effects, as a given input level can map to multiple output levels, depending on the input levels of modulation symbols at previous time instants.

Figure 10:
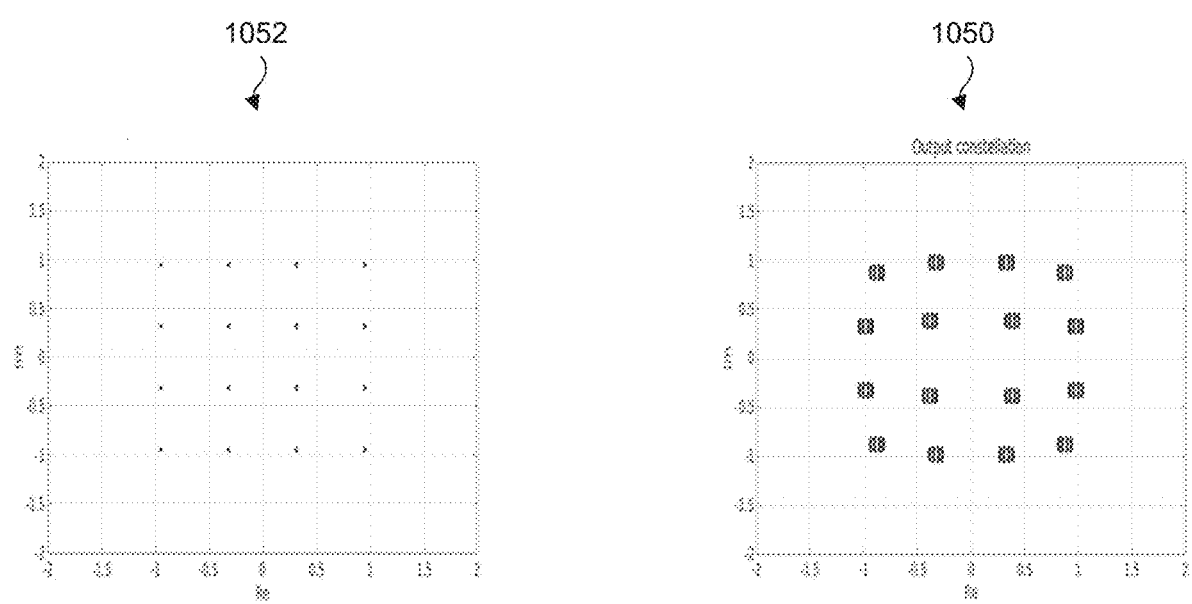
FIG. 10 illustrates a graph of an example of the impact of PA saturation and memory effects on a conventional modulation method according to embodiments of the present disclosure.

FIG. 10 illustrates a graph of an example of the impact of PA saturation and memory effects on a conventional modulation method according to embodiments of the present disclosure. In the example of FIG. 10, the conventional modulation method is 16-QAM. The constellation 1052 on the left is the conventional 16-QAM constellation. The constellation 1050 on the right corresponds to the PA output when the constellation 1052 is input to the PA. The impact of PA saturation can be seen in the inward shift of the four outermost constellation points (especially compared to their eight nearest neighbors). The impact of memory effects can be seen in the small "clumps" of points—if each input level only mapped to a single output level, then each of these small "clumps" would collapse to a single point.

Figure 11:
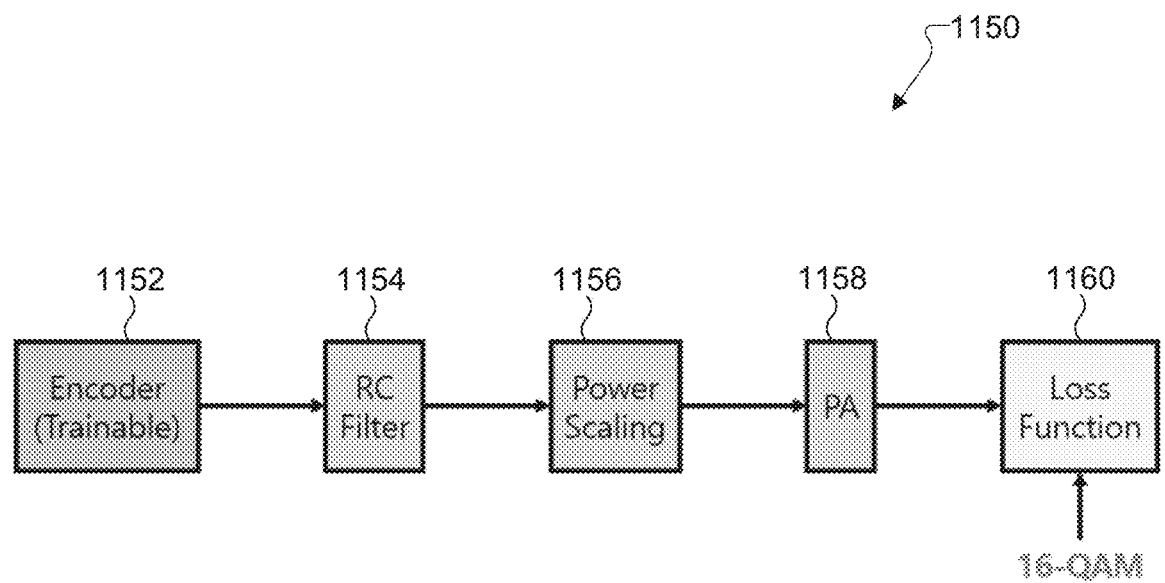
FIG. 11 illustrates an example system with a trainable modulator according to embodiments of the present disclosure.

FIG. 11 illustrates an example system 1150 with a trainable modulator according to embodiments of the present disclosure. It is understood that the example system 1150 could be implemented in a processor (e.g., a processor 340 of UE 116) in some embodiments. In various embodiments discussed below, the trainable modulator uses an AI-based (or ML-based) training scheme and for ease of explanation the trainable modulator is referred to as an AI-based modulator (that implements an AI-based modulation method), but it is understood that any other suitable training scheme could be used instead. The trainable modulator of example system 1150 may be used to design additional modulation methods (e.g., adjusted symbol constellations), such as constellations 502 and 504 of FIG. 5, which may account for the input-output PA characteristic.

For example, the trainable modulator may include a model of the PA input-output characteristic in the framework, and reduce (or preferably minimize) the difference between the constellations of the PA output in this framework and a conventional modulation method (e.g., square 16-QAM). In this example, a trainable encoder 1152 is placed in series with other blocks, i.e., an RC filter 1154, a power scaling block 1156, and a PA 1158. This encoder 1152 can be trained to reduce (and preferably to minimize) a loss function 1160 between the PA output and modulation symbols from a target constellation such as 16-QAM (which may correspond to a conventional symbol constellation scaled by the same amount as the PA gain).

Figure 12:
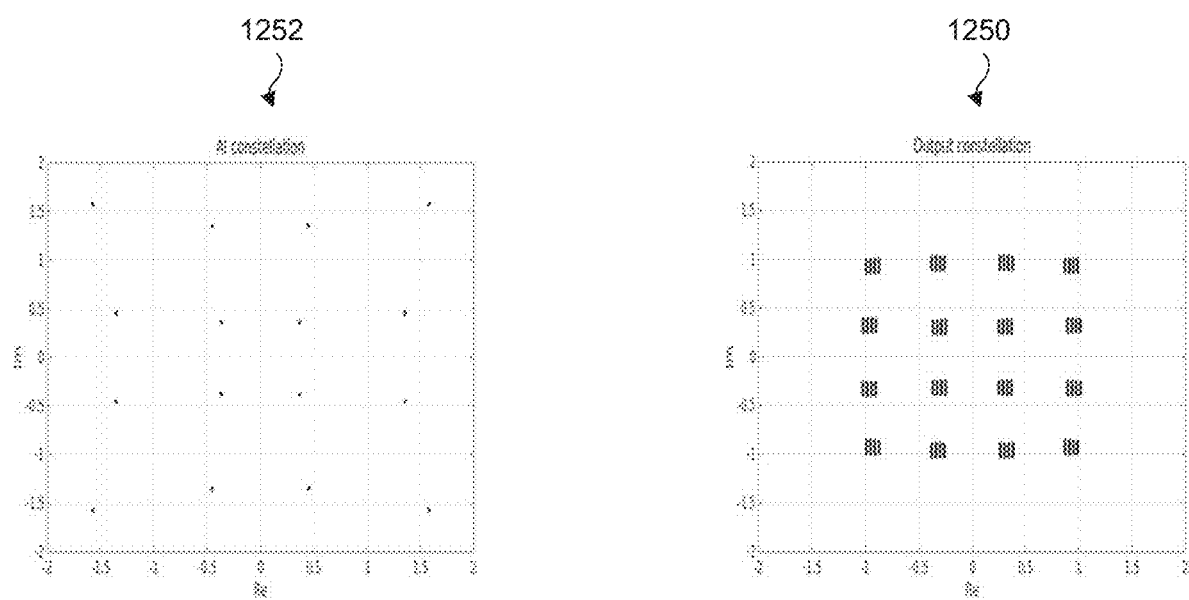
FIG. 12 illustrates a graph of an example of the impact of PA saturation and memory effects on an adjusted modulation method according to embodiments of the present disclosure.

FIG. 12 illustrates a graph of an example of the impact of PA saturation and memory effects on an adjusted modulation method according to embodiments of the present disclosure. In the example of FIG. 12, the adjusted modulation method has been designed using an AI architecture. The constellation 1252 on the left is the AI-designed constellation, which is based on the conventional 16-QAM constellation (e.g., constellation 1052 of FIG. 10) but is designed to compensate for the distortion effects of the PA. The constellation 1250 on the right corresponds to the PA output when the constellation 1252 is input to the PA. As compared to the constellation 1050 of FIG. 10, the reduction of the impact of PA saturation can be seen in the four outermost constellation points, which are now roughly on the same level as their eight nearest neighbors. The impact of memory effects can still be observed in the small clumps of points.

Figure 13:
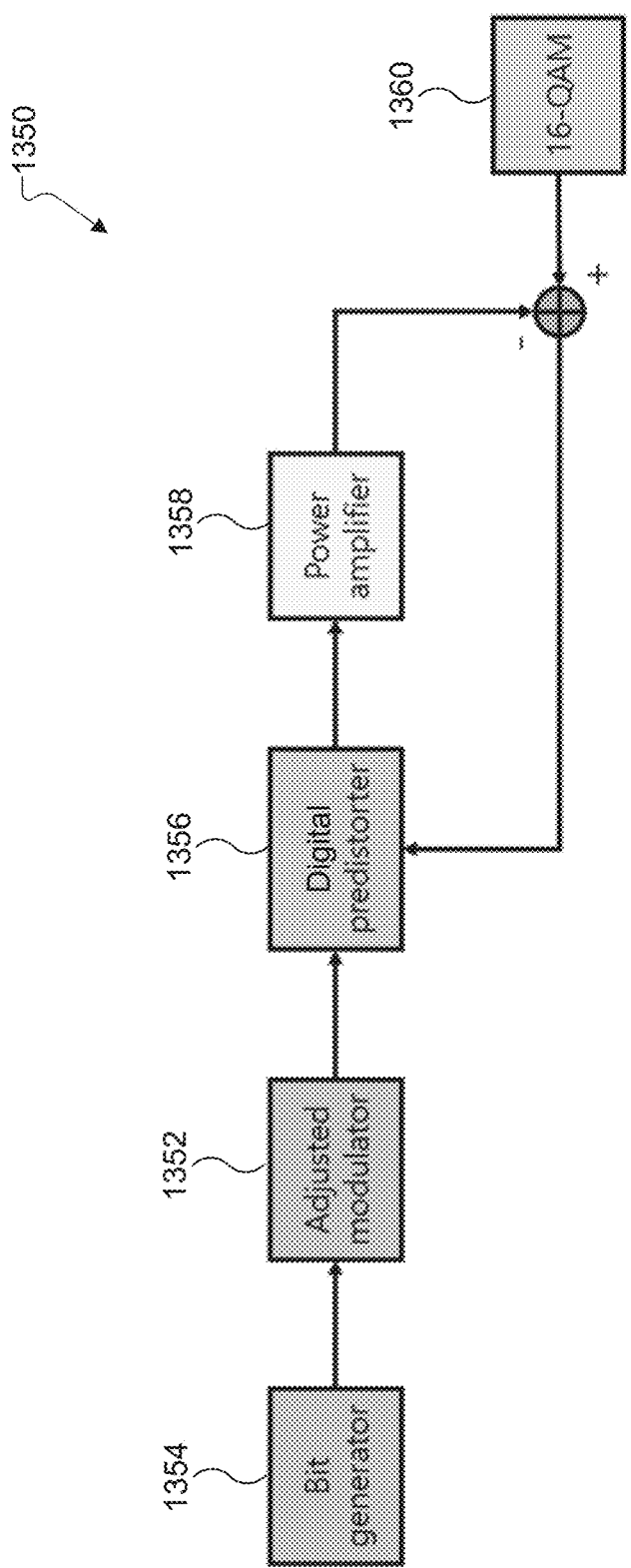
FIG. 13 illustrates an example wireless transmitter (Tx) architecture with a DPD according to embodiments of the present disclosure.

FIG. 13 illustrates an example wireless transmitter (Tx) architecture 1350 with a digital pre-distorter (DPD) according to embodiments of the present disclosure. The example of FIG. 13 may be implemented in, for example, the transceiver of a gNB 102 or a UE 116. In this example, the adjusted modulator 1352 corresponds to a modulation method that utilizes an adjusted symbol constellation such as one of the constellations in FIG. 5. This modulation method generates modulation symbols from encoded bits received from the bit generator 1354, and the modulation symbols are then passed to the DPD 1356. For this architecture, the DPD 1356 can be trained to reduce (and preferably to minimize) the difference between the output of the PA 1358 and an appropriately scaled version of a target constellation 1360, such as 16-QAM, to further reduce the impact of PA saturation and memory effects of the PA. The scaling factor that is applied to a target constellation such as 16-QAM is chosen to facilitate convergence of the DPD training process.

Figure 14:
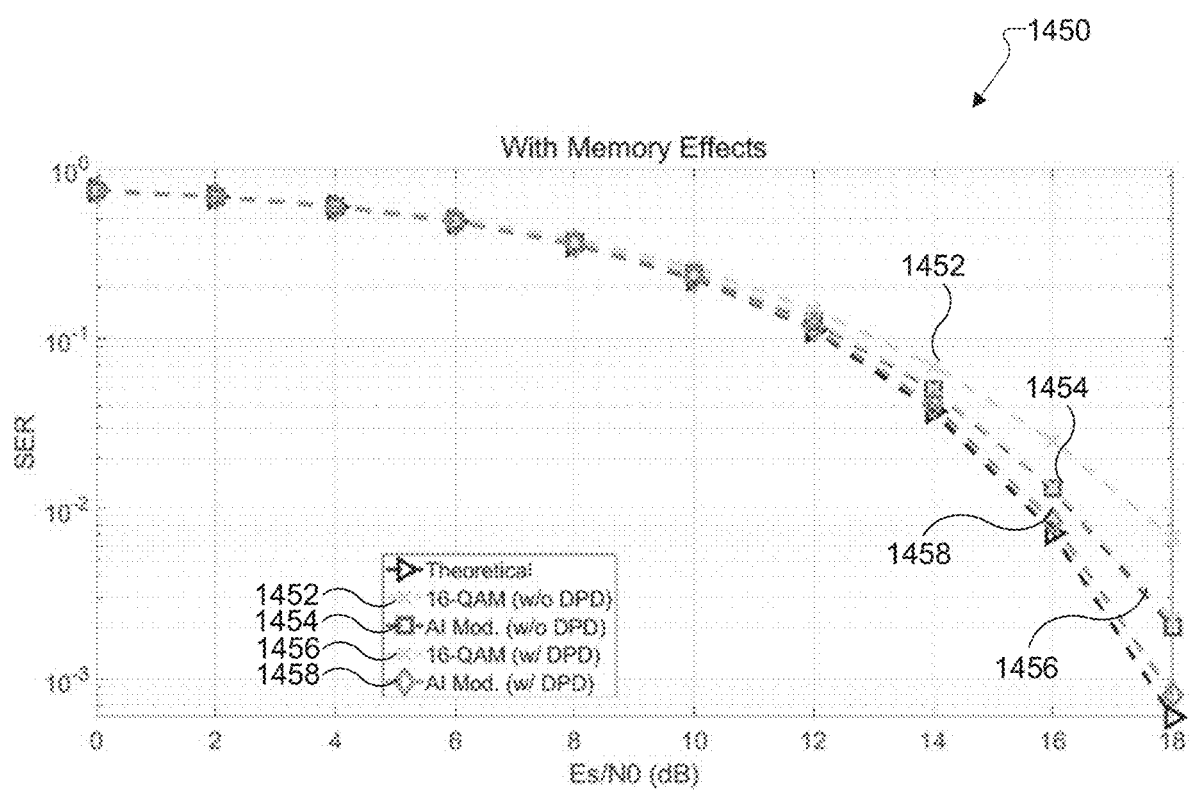
FIG. 14 is an example SER graph illustrating the impact of PA saturation and memory effects on different modulation methods according to embodiments of the present disclosure.

FIG. 14 is an example SER graph 1450 illustrating the impact of PA saturation and memory effects on different modulation methods according to embodiments of the present disclosure. Trace 1452 corresponds to a modulation method using the conventional 16-QAM constellation (without applying DPD). This modulation method is outperformed by an adjusted modulation method using an AI-designed constellation (without applying DPD), as seen in trace 1454, illustrating that this AI-designed constellation has reduced the impact of PA saturation. Applying DPD in conjunction with both of these modulation methods reduces the impact of residual memory effects, as seen in trace 1456 (for the conventional 16-QAM constellation) and trace 1458 (for the AI-designed constellation).

In some embodiments, a modulation method may be determined based on the transmission power of the UE. In the approach of these embodiments, the constellation points in a conventional modulation method, such as 16-QAM, can be adjusted depending on the transmission power level. The transmission power level may correspond to a power level of an output of a PA of a transmitter or transceiver of the UE, which may in turn correspond to the operating point of the PA.

In current practice, the PA operating point is typically backed-off from the saturation region to preserve PA linearity—i.e., uniform scaling of the (un-adjusted) input constellation. In embodiments of the present disclosure provided below, however, adjusting the constellation points can support a higher PA operating point (e.g., in the saturation region) maintaining PA efficiency while preserving PA linearity—i.e., uniform scaling of the (adjusted) input constellation.

Figure 15:
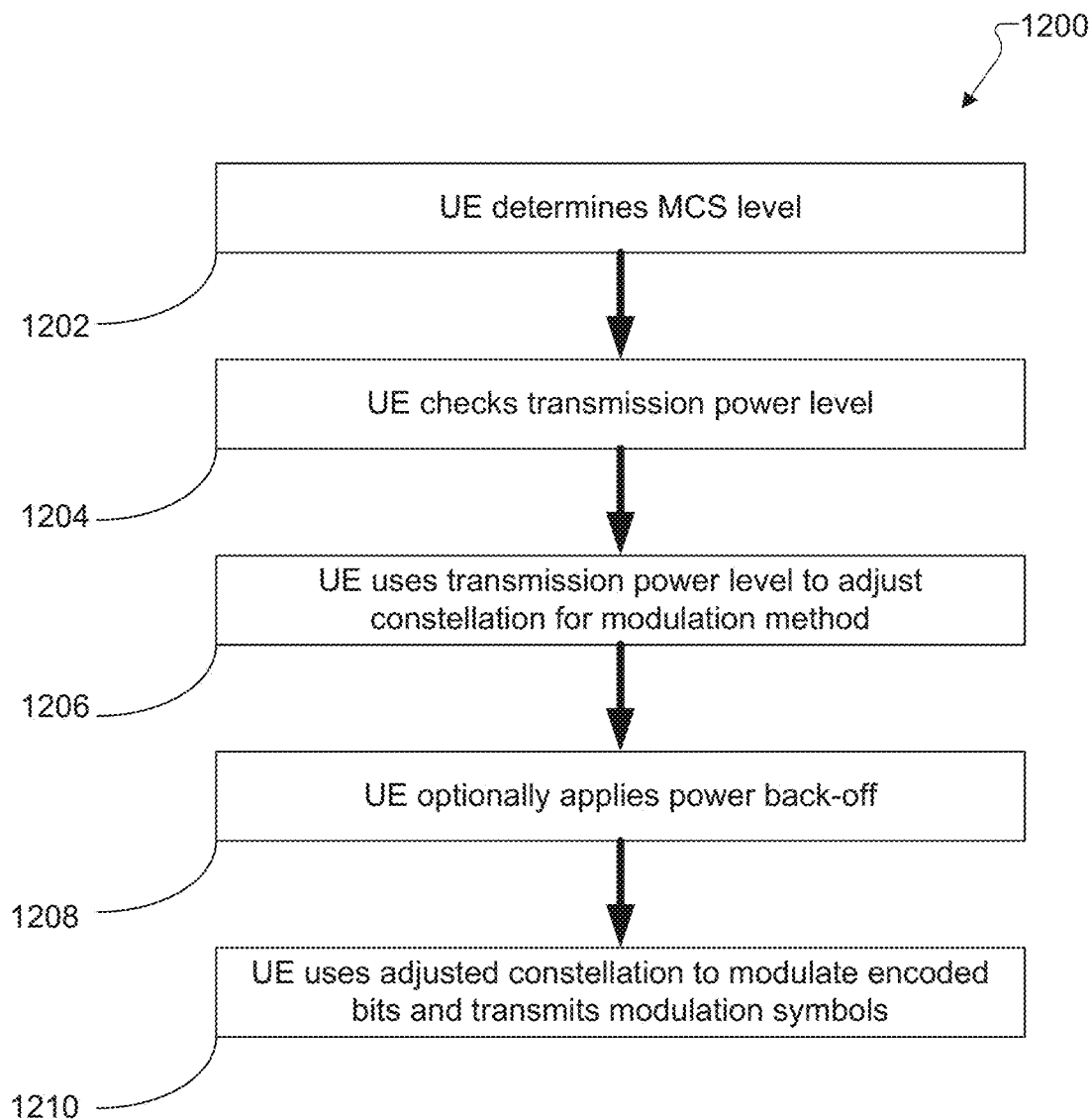
FIG. 15 illustrates an example method for operations of a UE to support power level-based constellation adjustment according to embodiments of the present disclosure.

FIG. 15 illustrates an example method 1200 for operations of a UE to support power level-based constellation adjustment according to embodiments of the present disclosure. At operation 1202, the UE determines an MCS index. In one example, this MCS index can be indicated by a BS. In another example, the UE autonomously determines this MCS index. At operation 1204, the UE checks its transmission power level. At operation 1206, the UE adjusts the constellation for its modulation method based on its transmission power level. In one example, the UE adjusts the location of the points in this constellation. At operation 1208, the UE can optionally apply a power back-off value in addition to the constellation adjustment in operation 1206. This back-off value can be smaller than the back-off values for the conventional square QAM constellations, as constellation adjustment has pre-compensated for PA saturation. In some embodiments, the UE may perform operations 1204 and 1206 (or 1204-1208) iteratively to alternately update the transmission power level and adjust the symbol constellation. At operation 1210, the UE uses the adjusted constellation to modulate encoded bits and sends the corresponding modulation symbols to the BS.

Figure 16:
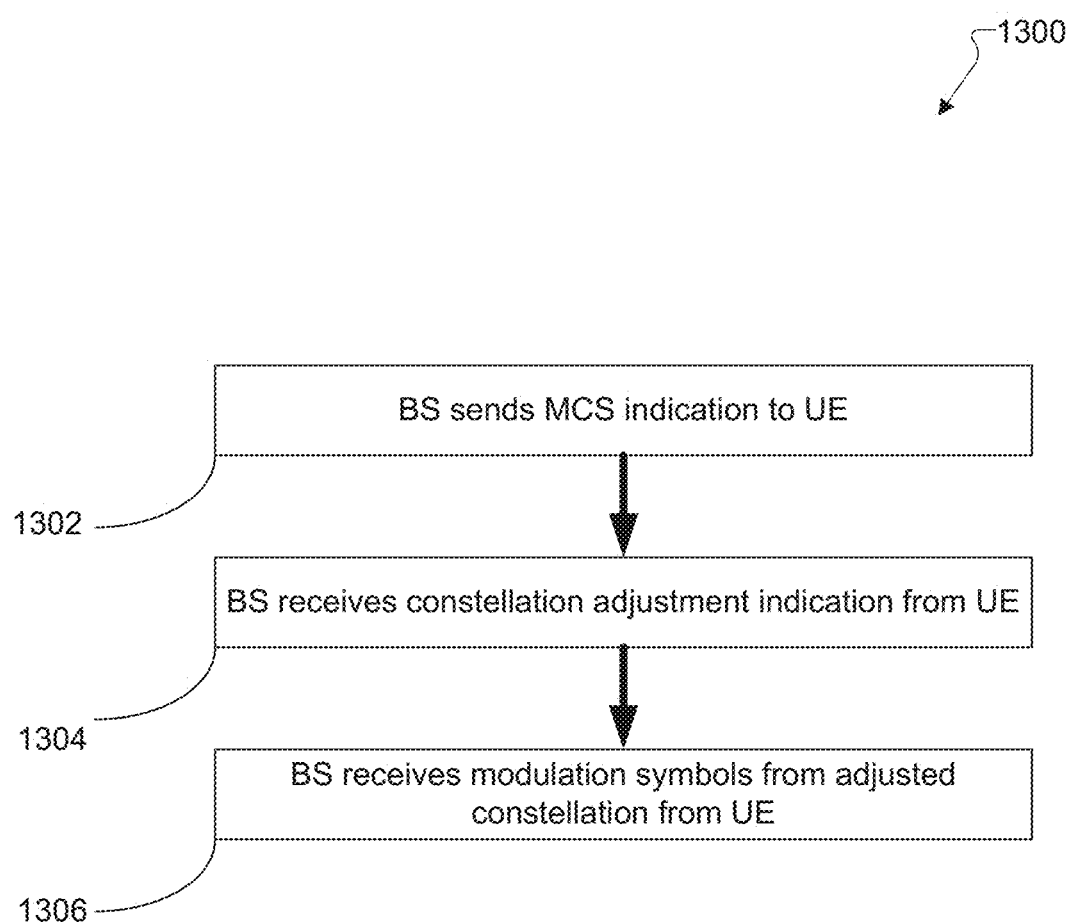
FIG. 16 illustrates an example method for operations of a BS to support power level-based constellation adjustment according to embodiments of the present disclosure.

FIG. 16 illustrates an example method 1300 for operations of a BS to support power level-based constellation adjustment according to embodiments of the present disclosure. At operation 1302, the BS sends an MCS indication to a UE. The BS can use an existing DCI format for this MCS indication message. The BS can also define a new DCI format for this MCS indication message. At operation 1304, the BS optionally receives a constellation adjustment indication from the UE. If the BS receives this constellation adjustment indication from the UE, then this indication corresponds to modulation symbols that the BS will receive in a subsequent slot (facilitating real-time demodulation). In one example, a dedicated/new MAC CE can be used for this indication, or an existing MAC CE can be used for this indication. In another example, this indication can be sent on the PUCCH or the PUSCH, where a new UCI format can be defined for this indication, or an existing UCI format can be used for this indication. If an existing UCI format is used for this indication, it can be included as a part of UCI and therefore reported together with CSI feedback as, e.g., a 1-bit indication in a CSI report. At operation 1306, the BS receives modulation symbols from an adjusted constellation from the UE.

In another example, the BS can pre-determine/configure information about the switching time to a modulation method based on an adjusted constellation. In this case, operation 1304 may be skipped, and the BS can receive modulation symbols from an adjusted constellation from the UE at a pre-determined/configured time in operation 1306.

In another example, between operation 1304 and operation 1306, the BS can perform an operation 1305. In operation 1305, the BS can send an ACK/NACK indication to the UE in response to a received constellation adjustment indication. If the BS sends an ACK, then the UE uses the adjusted constellation to generate modulation symbols. The BS receives these modulation symbols from the UE in operation 1306. If the BS sends a NACK, then the UE uses the un-adjusted constellation to generate modulation symbols, and the BS receives these modulation symbols from the UE in operation 1306. In operation 1305, in another example, the BS can send a configuration message for a constellation adjustment to the UE.

Figure 17:
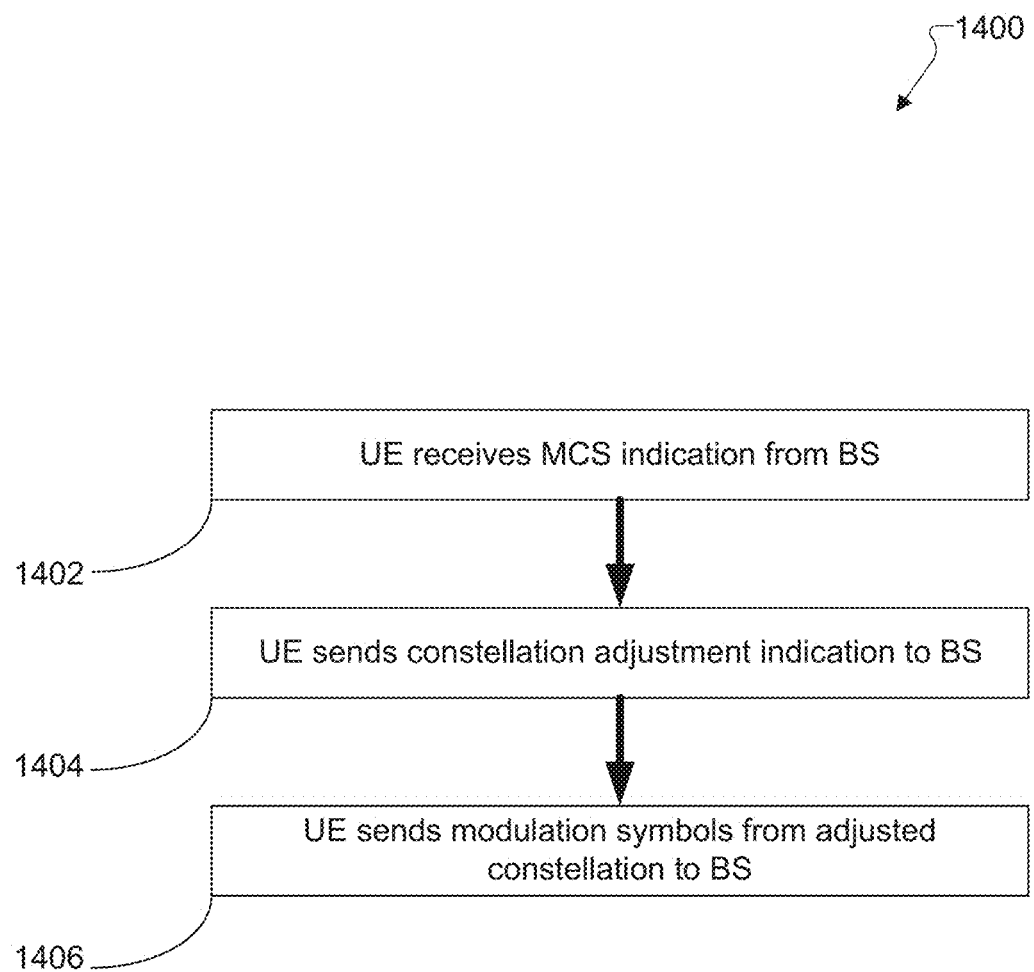
FIG. 17 illustrates an example method for operations of a UE to support power level-based constellation adjustment according to embodiments of the present disclosure.

FIG. 17 illustrates an example method 1400 for operations of a UE to support power level-based constellation adjustment according to embodiments of the present disclosure. At operation 1402, the UE receives an MCS indication from the BS. The BS can use an existing DCI format for this MCS indication message, or it can define a new DCI format for this MCS indication message. At operation 1404, the UE optionally sends a constellation adjustment indication to the BS. If the UE sends this constellation adjustment indication to the BS, then this indication corresponds to modulation symbols that the BS will receive in a subsequent slot (facilitating real-time demodulation). In one example, a dedicated/new MAC CE can be used for this indication, or an existing MAC CE can be used for this indication. In another example, this indication can be sent on the PUCCH or the PUSCH, where a new UCI format can be defined for this indication, or an existing UCI format can be used for this indication. If an existing UCI format is used for this indication, it can be included as a part of UCI and therefore reported together with CSI feedback as, e.g., a 1-bit indication in a CSI report. At operation 1406, the UE sends modulation symbols from an adjusted constellation to the BS.

In another example, the BS can pre-determine/configure information about the switching time to a modulation method based on an adjusted constellation. In this case, operation 1404 may be skipped, and the UE can send modulation symbols from an adjusted constellation to the BS at a pre-determined/configured time in operation 1406.

In another example, between operation 1404 and operation 1406, the UE can perform an operation 1405. In operation 1405, the UE can receive an ACK/NACK indication from the BS in response to a received constellation adjustment indication. If the UE receives an ACK, then the UE uses the adjusted constellation to generate modulation symbols, and the UE sends these modulation symbols to the BS in operation 1406. If the UE receives a NACK, then the UE uses the un-adjusted constellation to generate modulation symbols, and the UE sends these modulation symbols to the BS in operation 1406. In operation 1405, in another example, the UE can receive a configuration message for a constellation adjustment from the BS.

Figure 18:
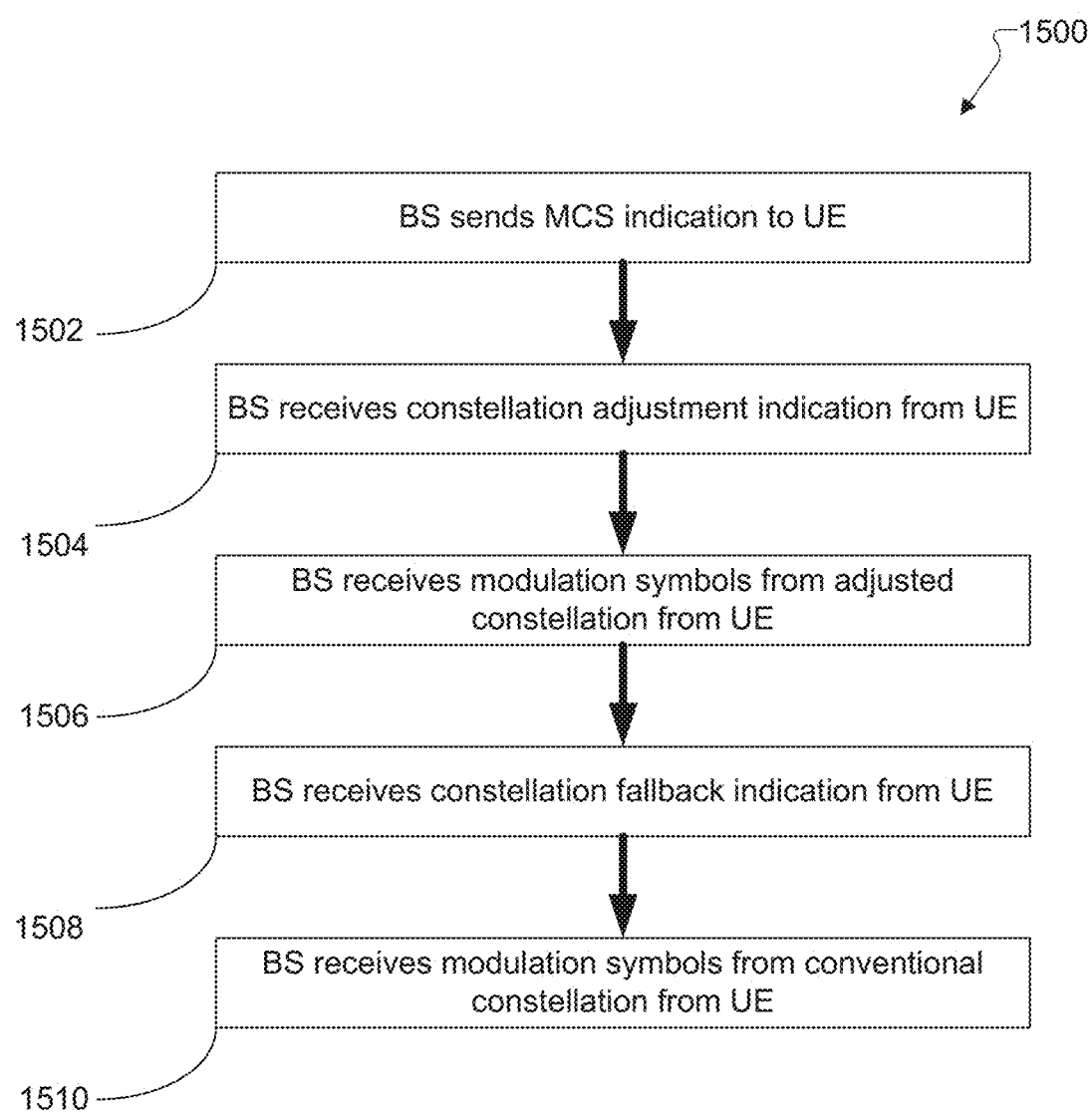
FIG. 18 illustrates an example method for operations of a BS to support UE-initiated fallback to a conventional constellation according to embodiments of the present disclosure.

FIG. 18 illustrates an example method 1500 for operations of a BS to support UE-initiated fallback to a conventional constellation according to embodiments of the present disclosure. At operation 1502, the BS sends an MCS indication to a UE. The BS can use an existing DCI format for this MCS indication message, or it can also define a new DCI format for this MCS indication message. At operation 1504, the BS optionally receives a constellation adjustment indication from the UE. In one example, a dedicated/new MAC CE can be used for this indication, or an existing MAC CE can be used for this indication. In another example, this indication can be sent on the PUCCH or the PUSCH, where a new UCI format can be defined for this indication, or an existing UCI format can be used for this indication. If an existing UCI format is used for this indication, it can be included as a part of UCI and therefore reported together with CSI feedback as, e.g., a 1-bit indication in a CSI report. At operation 1506, the BS receives modulation symbols from an adjusted constellation from the UE. At operation 1508, the BS receives a constellation fallback indication from the UE, which will be described further herein below. At operation 1510, the BS receives modulation symbols from a conventional constellation from the UE.

In another example, the BS can pre-determine/configure information about the switching time to a modulation method based on an adjusted constellation. In this case, operation 1504 does not need to be performed, and the BS can receive modulation symbols from an adjusted constellation from the UE at a pre-determined/configured time in operation 1506.

In another example, between operation 1504 and operation 1506, the BS can perform an operation 1505. In operation 1505, the BS can send an ACK/NACK indication to the UE in response to a received constellation adjustment indication. If the BS sends an ACK, then the UE uses the adjusted constellation to generate modulation symbols, and the BS receives these modulation symbols from the UE in operation 1506. If the BS sends a NACK, then the UE uses the un-adjusted constellation to generate modulation symbols, and the BS receives these modulation symbols from the UE in operation 1506. In operation 1505, in another example, the BS can send a configuration message for a constellation adjustment to the UE.

Figure 19:
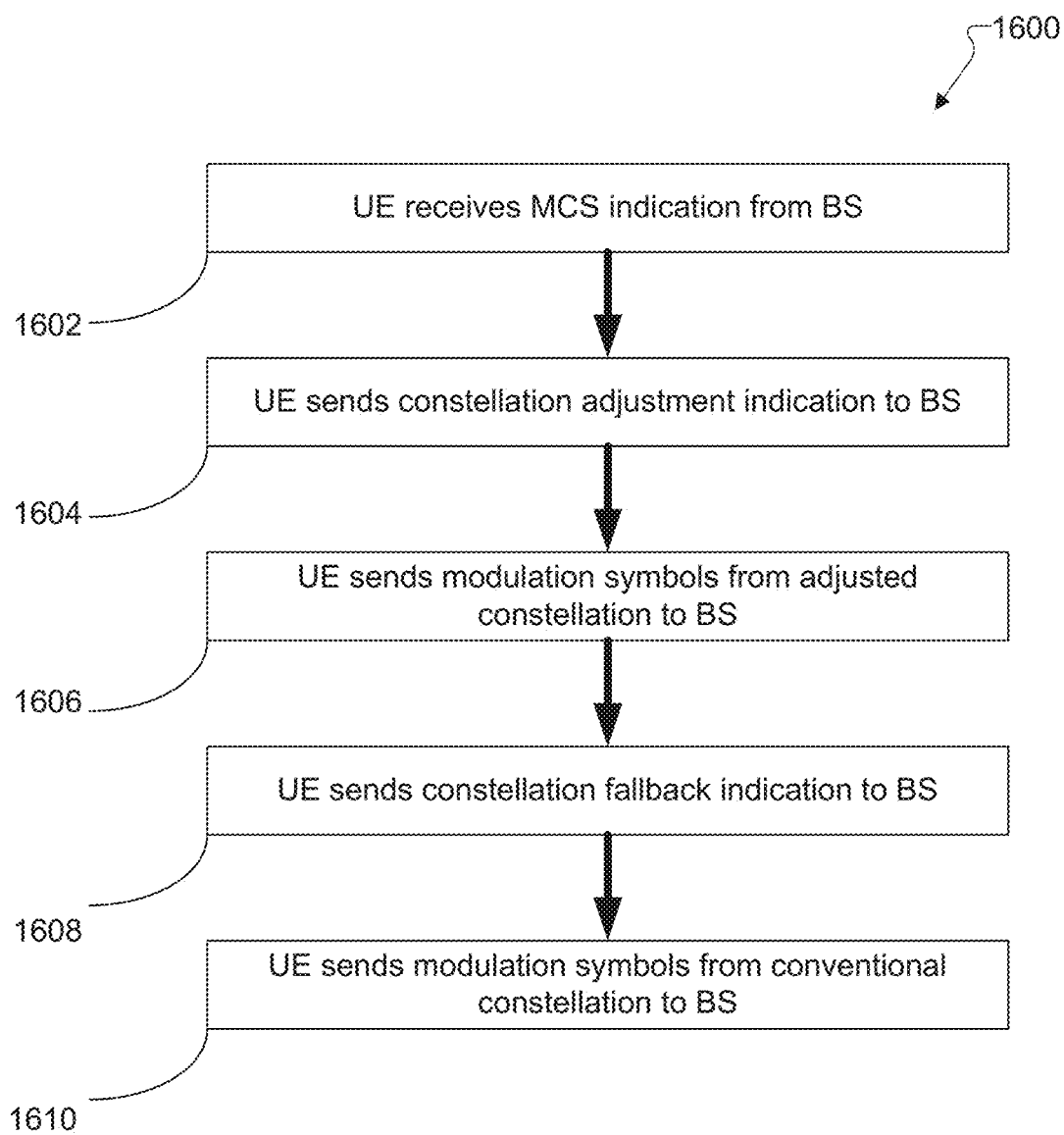
FIG. 19 illustrates an example method for operations of a UE to support UE-initiated fallback to a conventional constellation without the constellation adjustment according to embodiments of the present disclosure.

FIG. 19 illustrates an example method 1600 for operations of a UE to support UE-initiated fallback to a conventional constellation without the constellation adjustment according to embodiments of the present disclosure. At operation 1602, the UE receives an MCS indication from the BS. The BS can use an existing DCI format for this MCS indication message, or it can also define a new DCI format for this MCS indication message. At operation 1604, the UE optionally sends a constellation adjustment indication to the BS. In one example, a dedicated/new MAC CE can be used for this indication, or an existing MAC CE can be used for this indication. In another example, this indication can be sent on the PUCCH or the PUSCH, where a new UCI format can be defined for this indication, or an existing UCI format can be used for this indication. If an existing UCI format is used for this indication, it can be included as a part of UCI and therefore reported together with CSI feedback as, e.g., a 1-bit indication in a CSI report. At operation 1606, the UE sends modulation symbols from an adjusted constellation to the BS. At operation 1608, the UE sends a constellation fallback indication to the BS, which will be described further herein below. At operation 1610, the UE sends modulation symbols from a conventional constellation to the BS.

In another example, the BS can pre-determine/configure information about the switching time to a modulation method based on an adjusted constellation. In this case, operation 1604 may be skipped, and the UE can send modulation symbols from an adjusted constellation to the BS at a pre-determined/configured time in operation 1606.

In another example, between operation 1604 and operation 1606, the UE can perform an operation 1605. In operation 1605, the UE can receive an ACK/NACK indication from the BS in response to a received constellation adjustment indication. If the UE receives an ACK, then the UE uses the adjusted constellation to generate modulation symbols, and the UE sends these modulation symbols to the BS in operation 1606. If the UE receives a NACK, then the UE uses the un-adjusted constellation to generate modulation symbols, and the UE sends these modulation symbols to the BS in operation 1606. In operation 1605, in another example, the UE can receive a configuration message for a constellation adjustment from the BS.

Figure 20:
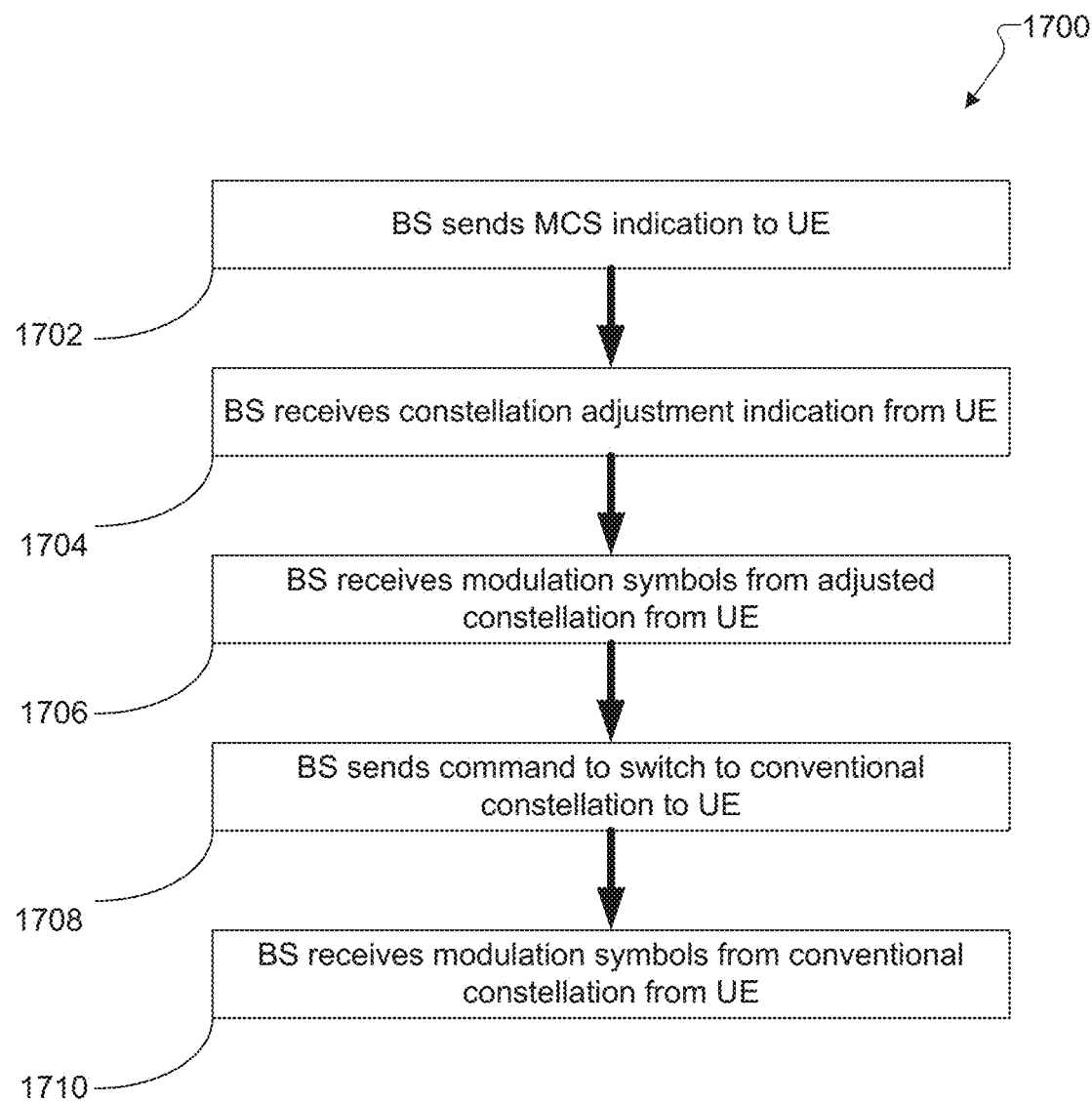
FIG. 20 illustrates an example method for operations of a BS to support BS-initiated fallback to a conventional constellation according to embodiments of the present disclosure.

FIG. 20 illustrates an example method 1700 for operations of a BS to support BS-initiated fallback to a conventional constellation according to embodiments of the present disclosure. At operation 1702, the BS sends an MCS indication to a UE. The BS can use an existing DCI format for this MCS indication message, or it can also define a new DCI format for this MCS indication message. At operation 1704, the BS optionally receives a constellation adjustment indication from the UE. In one example, a dedicated/new MAC CE can be used for this indication, or an existing MAC CE can be used for this indication. In another example, this indication can be sent on the PUCCH or the PUSCH, where a new UCI format can be defined for this indication, or an existing UCI format can be used for this indication. If an existing UCI format is used for this indication, it can be included as a part of UCI and therefore reported together with CSI feedback as, e.g., a 1-bit indication in a CSI report. At operation 1706, the BS receives modulation symbols from an adjusted constellation from the UE. At operation 1708, the BS sends a command to the UE to switch to a conventional constellation. In one example, the BS can configure the UE to switch to a conventional constellation via a PDCCH order, where a new DCI format can be defined and this PDCCH order can be triggered by this new DCI format. In another example, the BS can configure the UE to switch to a conventional constellation via an RRC reconfiguration message. At operation 1710, the BS receives modulation symbols from a conventional constellation from the UE.

In another example, the BS can pre-determine/configure information about the switching time to a modulation method based on an adjusted constellation. In this case, operation 1704 does not need to be performed, and the BS can receive modulation symbols from an adjusted constellation from the UE at a pre-determined/configured time in operation 1706.

In another example, between operation 1704 and operation 1706, the BS can perform an operation 1705. In operation 1705, the BS can send an ACK/NACK indication to the UE in response to a received constellation adjustment indication. If the BS sends an ACK, then the UE uses the adjusted constellation to generate modulation symbols, and the BS receives these modulation symbols from the UE in operation 1706. If the BS sends a NACK, then the UE uses the un-adjusted constellation to generate modulation symbols, and the BS receives these modulation symbols from the UE in operation 1706. In operation 1705, in another example, the BS can send a configuration message for a constellation adjustment to the UE.

Figure 21:
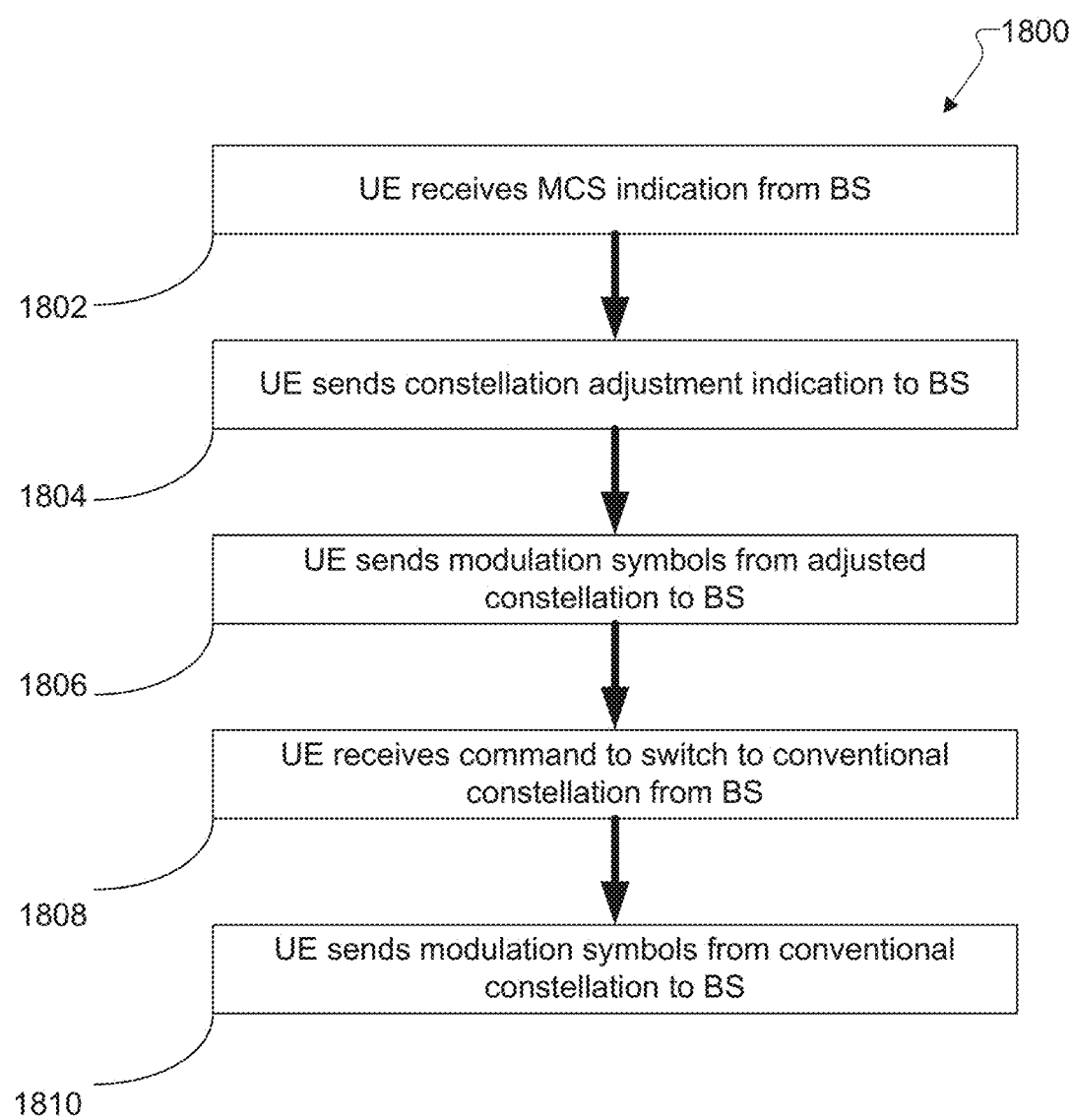
FIG. 21 illustrates an example method for operations of a UE to support BS-initiated fallback to a conventional constellation according to embodiments of the present disclosure.

FIG. 21 illustrates an example method 1800 for operations of a UE to support BS-initiated fallback to a conventional constellation according to embodiments of the present disclosure. At operation 1802, the UE receives an MCS indication from a BS. The BS can use an existing DCI format for this MCS indication message, or it can also define a new DCI format for this MCS indication message. At operation 1804, the UE (optionally) sends a constellation adjustment indication to the BS. In one example, a dedicated/new MAC CE can be used for this indication, or an existing MAC CE can be used for this indication. In another example, this indication can be sent on the PUCCH or the PUSCH, where a new UCI format can be defined for this indication, or an existing UCI format can be used for this indication. If an existing UCI format is used for this indication, it can be included as a part of UCI and therefore reported together with CSI feedback as, e.g., a 1-bit indication in a CSI report. At operation 1806, the UE sends modulation symbols from an adjusted constellation to the BS. At operation 1808, the UE receives a command from the BS to switch to a conventional constellation. In one example, the BS can configure the UE to switch to a conventional constellation via a PDCCH order, where a new DCI format can be defined and this PDCCH order can be triggered by this new DCI format. In another example, the BS can configure the UE to switch to a conventional constellation via an RRC reconfiguration message. At operation 1810, the UE sends modulation symbols from a conventional constellation to the BS.

In another example, the BS can pre-determine/configure information about the switching time to a modulation method based on an adjusted constellation. In this case, operation 1804 does not need to be performed, and the UE can send modulation symbols from an adjusted constellation to the BS at a pre-determined/configured time in operation 1806.

In another example, between operation 1804 and operation 1806, the UE can perform an operation 1805. In operation 1805, the UE can receive an ACK/NACK indication from the BS in response to a received constellation adjustment indication. If the UE receives an ACK, then the UE uses the adjusted constellation to generate modulation symbols, and the UE sends these modulation symbols to the BS in operation 1806. If the UE receives a NACK, then the UE uses the un-adjusted constellation to generate modulation symbols, and the UE sends these modulation symbols to the BS in operation 1806. In operation 1805, in another example, the UE can receive a configuration message for a constellation adjustment from the BS.

In one embodiment, a new MAC CE can be defined for the constellation adjustment indication used in the above examples. This MAC CE can be identified by a MAC subheader with a logical channel ID. This MAC CE can have a variable size and include the following fields:

Transmission Power Level: This field indicates the transmission power level for the UE, e.g., as measured in dBm. This field can also include the power back-off value that the UE has optionally applied.

Original Constellation: This field indicates the conventional modulation method that the UE has adjusted, e.g., as an index to a table of pre-defined conventional modulation methods.

Adjusted Points: In one example, this field can include a list of tuples, where each tuple can contain an index to a point in a constellation for a conventional modulation method and the real/imaginary values of the adjustment that the UE applied to that point. In another example, this field can include a list of tuples, where each tuple can contain an index to a point in a constellation for a conventional modulation method and the values of the amplitude/phase adjustment that the UE applied to that point.

Figure 22:
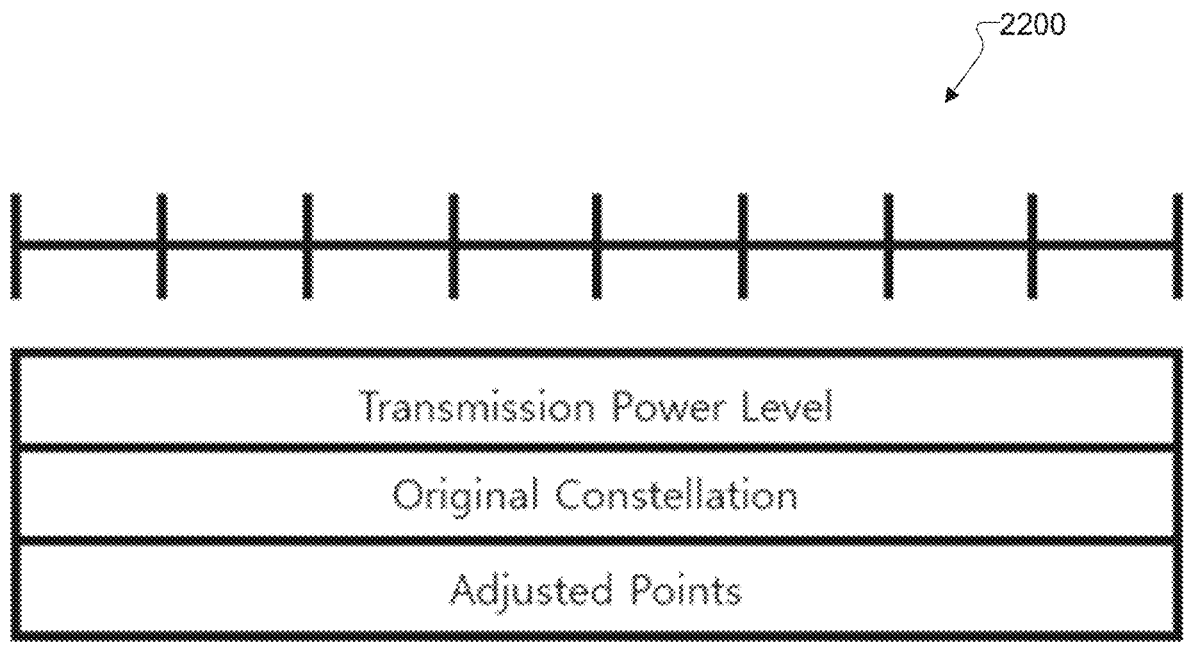
FIG. 22 illustrates an example format of a new MAC CE for the constellation adjustment indication according to embodiments of the present disclosure.

FIG. 22 illustrates an example format of a new MAC CE 2200 for the constellation adjustment indication according to embodiments of the present disclosure. In this example, the Transmission Power Level, Original Constellation, and Adjusted Points fields each have a length of 8 bits.

In another embodiment, a BS can configure a UE to send a constellation adjustment indication via DCI.

In one embodiment, a new MAC CE can be defined for the constellation fallback indication used in the above examples. This MAC CE can be identified by a MAC subheader with a logical channel ID. This MAC CE can have a variable size and include the following field:

Constellation Fallback: This field indicates the conventional modulation method that the UE is requesting, e.g., as an index to a table of pre-defined conventional modulation methods.

Figure 23:
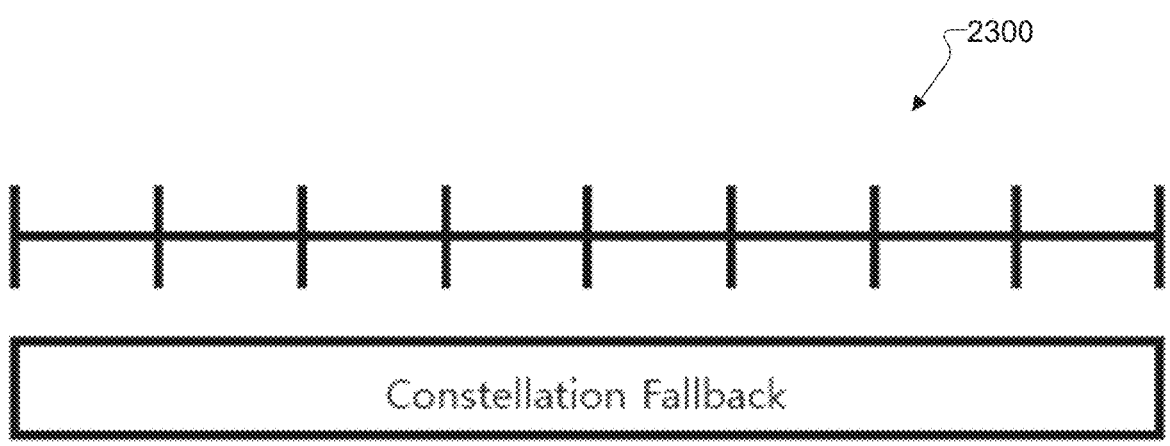
FIG. 23 illustrates an example format of a new MAC CE for the constellation fallback indication according to embodiments of the present disclosure.

FIG. 23 illustrates an example format of a new MAC CE 2300 for the constellation fallback indication according to embodiments of the present disclosure. In this example, the Constellation Fallback field has a length of 8 bits.

In one embodiment, a BS can configure a UE to send a constellation fallback indication via DCI.

Figure 24:
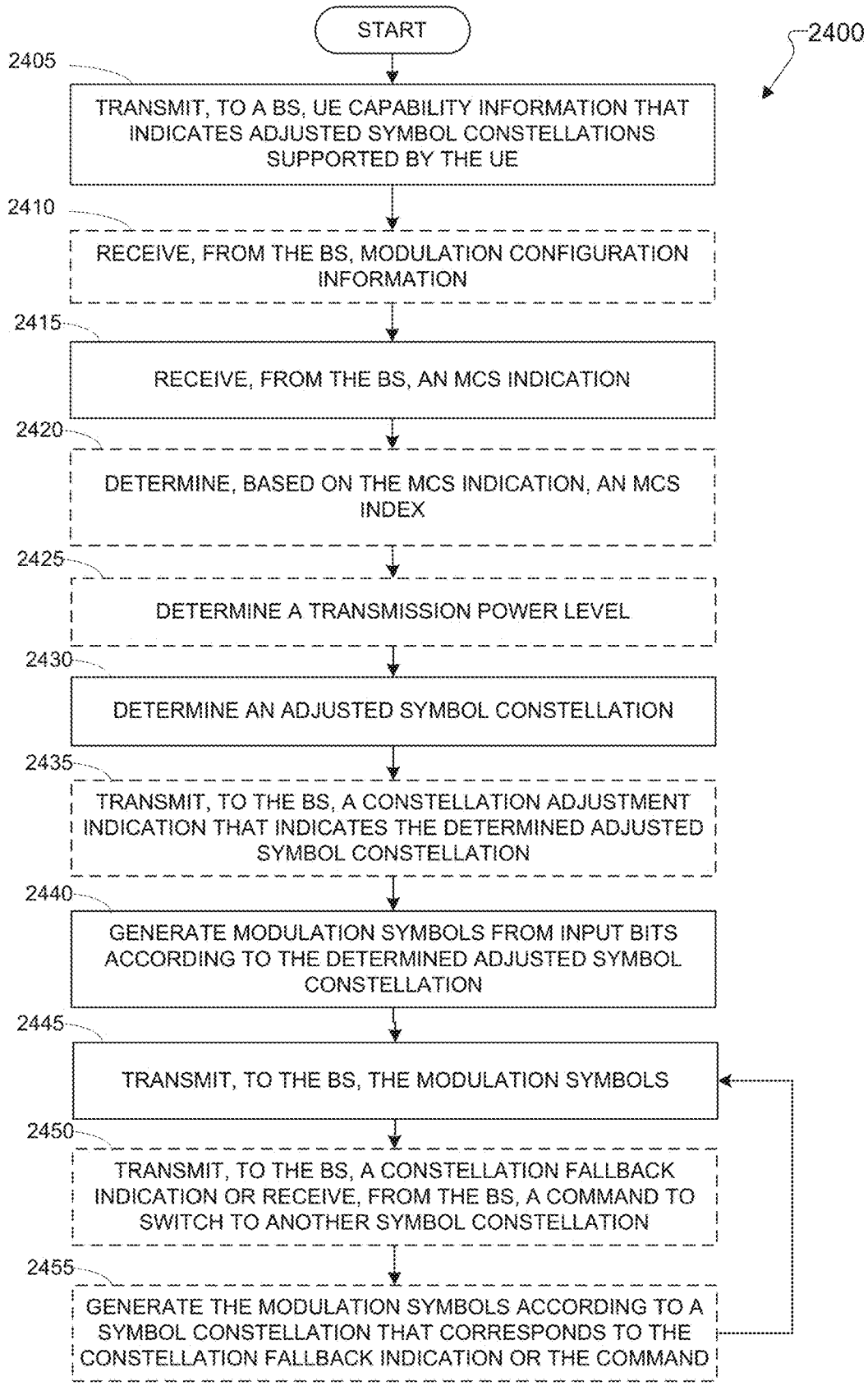
FIG. 24 illustrates an example process for symbol modulation that accounts for distortion introduced by a PA in a wireless transmission device according to various embodiments of the present disclosure.

FIG. 24 illustrates an example process 2400 for symbol modulation that accounts for distortion introduced by a PA in a wireless transmission device according to various embodiments of the present disclosure. The process 2400 of FIG. 24 is performed by a wireless device that includes a transceiver and a processor. For convenience, the process 2400 of FIG. 24 will be described as performed by a UE (e.g., a 5G/NR UE 116), but it is understood that the process 2400 or a corresponding process may be performed by a 5G/NR base station (e.g., a gNB 102), or by any other suitable wireless communication device (e.g., 6G and beyond devices).

Beginning at step 2405, the UE transmits, to a BS, UE capability information that indicates adjusted symbol constellations supported by the UE. The adjusted symbol constellations may be adjusted (e.g., from symbol constellations such as 16-QAM) to pre-compensate for distortion effects of a PA in the transceiver of the UE.

In some embodiments, the UE may then receive, from the BS, modulation configuration information (step 2410). The modulation configuration information may indicate a mapping between MCS indices and the adjusted symbol constellations supported by the UE. For example, the modulation configuration information may comprise information that maps MCS indices to entries in a LUT. The entries in such a LUT may be coordinates in the complex plane that correspond to points of an adjusted symbol constellation, and modulation symbols may be generated according to the coordinates in a selected LUT entry (e.g., an entry that maps to a determined MCS index).

Next, the UE receives, from the BS, an MCS indication (step 2415). The MCS indication may, in some embodiments, indicate an MCS index for use by the UE.

In some embodiments, the UE then determines, based on the MCS indication, an MCS index (step 2420).

In some embodiments, the UE next determines a transmission power level (step 2425). The transmission power level may be related to an operating point of the PA in the transceiver of the UE. The transmission power level may be determined based on the MCS indication or MCS index.

The UE then determines an adjusted symbol constellation (step 2430). For example, the UE may select an adjusted symbol constellation from a list of adjusted symbol constellations that the UE is capable of supporting. In some embodiments, the UE determines the adjusted symbol constellation based on an MCS index (such as that determined at step 2420), or based on the MCS index and a mapping between MCS indices and the adjusted symbol constellations supported by the UE (such as that provided by the BS at step 2410).

In some embodiments, the UE at step 2430 may adjust an existing symbol constellation (e.g., the 16-QAM symbol constellation) based on parameters such as the transmission power level determined at step 2425—for example, the UE may determine the adjusted symbol constellation to pre-compensate for at least some of the distortion effects of the PA at the determined transmission power level. The UE may, in some embodiments, iteratively update the transmission power (e.g., returning to step 2425) and then determine a new adjusted symbol constellation at step 2430.

At step 2435, the UE may transmit, to the BS, a constellation adjustment indication that indicates the determined adjusted symbol constellation. For example, if the UE has determined the adjusted symbol constellation by adjusting an existing constellation on its own, it may transmit the constellation adjustment indication to inform the BS of the adjusted symbol constellation. If the UE has not made any adjustments to the symbol constellation on its own (e.g., if the UE has selected an adjusted symbol constellation based on the MCS indication sent by the BS), then the UE may skip this step.

The UE then generates modulation symbols from input bits according to the determined adjusted symbol constellation (step 2440), after which the UE transmits, to the BS, the modulation symbols (step 2445).

In some embodiments, the UE may transmit, to the BS, a constellation fallback indication or receive, from the BS, a command to switch to another symbol constellation (step 2450). This may occur before or after the UE has transmitted modulation symbols to the BS at step 2445. In either case, the UE then generates the modulation symbols according to a symbol constellation that corresponds to the constellation fallback indication or to the other symbol constellation that corresponds to the command (step 2455). The UE then transmits these modulation symbols to the BS at step 2445.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
   a transceiver configured to:
   transmit, to a base station (BS), UE capability information that indicates support for adjusted symbol constellations, wherein the adjusted symbol constellations are adjusted to pre-compensate for distortion effects of a power amplifier (PA) in the transceiver, and
   receive, from the BS, a modulation and coding scheme (MCS) indication; and
   a processor operably coupled to the transceiver and configured to:
   determine, based on the MCS indication, an adjusted symbol constellation, and
   generate modulation symbols from input bits according to the determined adjusted symbol constellation,
   wherein the transceiver is further configured to transmit, to the BS, the modulation symbols.

2. The UE of claim 1, wherein:
   the transceiver is further configured to receive, from the BS, modulation configuration information that indicates a mapping between MCS indices and the adjusted symbol constellations supported by the UE, and
   the processor is further configured to:
   determine, based on the MCS indication, an MCS index; and
   determine, based on the MCS index and the mapping, the adjusted symbol constellation.

3. The UE of claim 2, wherein:
   the modulation configuration information comprises information that maps MCS indices to entries in a lookup table (LUT),
   the entries in the LUT are coordinates in a complex plane that correspond to points of an adjusted symbol constellation, and
   the processor is further configured to generate the modulation symbols from the input bits according to the coordinates in the LUT entry that maps to the determined MCS index.

4. The UE of claim 1, wherein the processor is further configured to:
   determine, based on the MCS indication, a transmission power level and the adjusted symbol constellation to pre-compensate for at least some of the distortion effects of the PA at the transmission power level.

5. The UE of claim 4, wherein the transceiver is further configured to:
transmit, to the BS, a constellation adjustment indication that indicates the determined adjusted symbol constellation; and
transmit the modulation symbols after transmission of the constellation adjustment indication.

6. The UE of claim 1, wherein:
the transceiver is further configured to transmit, to the BS, a constellation fallback indication, and
the processor is further configured to generate the modulation symbols according to a symbol constellation that corresponds to the constellation fallback indication.

7. The UE of claim 1, wherein:
the transceiver is further configured to receive, from the BS, a command to switch to another symbol constellation, and
the processor is further configured to generate the modulation symbols according to the other symbol constellation that corresponds to the command.

8. A base station (BS) comprising:
a transceiver configured to receive, from a user equipment (UE), UE capability information that indicates adjusted symbol constellations supported by the UE, wherein the adjusted symbol constellations are adjusted to pre-compensate for distortion effects of a power amplifier (PA) in a transceiver of the UE; and
a processor operably coupled to the transceiver and configured to generate, based on the UE capability information, a modulation and coding scheme (MCS) indication,
wherein the transceiver is further configured to:
transmit, to the UE, the MCS indication, and
receive, from the UE, modulation symbols corresponding to an adjusted symbol constellation that corresponds to the MCS indication.

9. The BS of claim 8, wherein:
the processor is further configured to generate modulation configuration information that indicates a mapping between MCS indices and the adjusted symbol constellations supported by the UE,
the transceiver is further configured to transmit, to the UE, the modulation configuration information,
an MCS index is determined based on the MCS indication, and
the adjusted symbol constellation of the received modulation symbols corresponds to the MCS index and the mapping.

10. The BS of claim 9, wherein:
the modulation configuration information comprises information that maps MCS indices to entries in a lookup table (LUT),
the entries in the LUT are coordinates in a complex plane that correspond to points of an adjusted symbol constellation, and
the received modulation symbols correspond to the coordinates in the LUT entry that maps to the determined MCS index.

11. The BS of claim 8, wherein:
the adjusted symbol constellation of the received modulation symbols corresponds to the MCS indication and a transmission power level of the UE, and
the adjusted symbol constellation pre-compensates for at least some of the distortion effects of the PA at the determined transmission power level.

12. The BS of claim 11, wherein the transceiver is further configured to:
receive, from the UE, a constellation adjustment indication that indicates the adjusted symbol constellation; and
receive the modulation symbols after reception of the constellation adjustment indication.

13. The BS of claim 8, wherein:
the transceiver is further configured to receive, from the UE, a constellation fallback indication, and
the received modulation symbols correspond to a symbol constellation that corresponds to the constellation fallback indication.

14. The BS of claim 8, wherein:
the transceiver is further configured to transmit, to the UE, a command to switch to another symbol constellation, and
the received modulation symbols correspond to the other symbol constellation that corresponds to the command.

15. A method of operation of a user equipment (UE), comprising:
transmitting, to a base station (BS), UE capability information that indicates adjusted symbol constellations supported by the UE, wherein the adjusted symbol constellations are adjusted to pre-compensate for distortion effects of a power amplifier (PA) in a transceiver of the UE;
receiving, from the BS, a modulation and coding scheme (MCS) indication;
determining, based on the MCS indication, an adjusted symbol constellation;
generating modulation symbols from input bits according to the determined adjusted symbol constellation; and
transmitting, to the BS, the modulation symbols.

16. The method of claim 15, further comprising:
receiving, from the BS, modulation configuration information that indicates a mapping between MCS indices and the adjusted symbol constellations supported by the UE;
determining, based on the MCS indication, an MCS index; and
determining, based on the MCS index and the mapping, the adjusted symbol constellation.

17. The method of claim 16, wherein:
the modulation configuration information comprises information that maps MCS indices to entries in a lookup table (LUT),
the entries in the LUT are coordinates in a complex plane that correspond to points of an adjusted symbol constellation, and
the method comprises generating the modulation symbols from the input bits according to the coordinates in the LUT entry that maps to the determined MCS index.

18. The method of claim 15, further comprising:
determining, based on the MCS indication, a transmission power level and the adjusted symbol constellation to pre-compensate for at least some of the distortion effects of the PA at the determined transmission power level.

19. The method of claim 18, further comprising:
transmitting, to the BS, a constellation adjustment indication that indicates the determined adjusted symbol constellation; and
transmitting the modulation symbols after transmission of the constellation adjustment indication.

20. The method of claim 15, further comprising:
transmitting, to the BS, a constellation fallback indication, and generating the modulation symbols according to a symbol constellation that corresponds to the constellation fallback indication.

\* \* \* \* \*